(12) United States Patent
Liang et al.

(10) Patent No.: US 12,119,455 B2
(45) Date of Patent: Oct. 15, 2024

(54) ELECTRODE ASSEMBLY AND RELATED BATTERY, BATTERY MODULE

(71) Applicant: CONTEMPORARY AMPEREX TECHNOLOGY (HONG KONG) LIMITED, Hong Kong (CN)

(72) Inventors: Chengdu Liang, Ningde (CN); Hu Xu, Ningde (CN); Haizu Jin, Ningde (CN); Yuqun Zeng, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 781 days.

(21) Appl. No.: 17/253,598

(22) PCT Filed: Jun. 2, 2020

(86) PCT No.: PCT/CN2020/094041
§ 371 (c)(1),
(2) Date: Dec. 17, 2020

(87) PCT Pub. No.: WO2021/243584
PCT Pub. Date: Dec. 9, 2021

(65) Prior Publication Data
US 2021/0376387 A1 Dec. 2, 2021

(51) Int. Cl.
*H01M 10/0585* (2010.01)
*H01M 4/62* (2006.01)
(Continued)

(52) U.S. Cl.
CPC ....... *H01M 10/0585* (2013.01); *H01M 4/623* (2013.01); *H01M 4/626* (2013.01);
(Continued)

(58) Field of Classification Search
CPC .......... H01M 10/0585; H01M 50/249; H01M 50/209; H01M 4/623; H01M 4/626; H01M 2220/20
See application file for complete search history.

(56) References Cited

U.S. PATENT DOCUMENTS 7,833,656 B2  11/2010  Nishimura et al.
10,644,322 B2  5/2020  Xing et al.
(Continued)

FOREIGN PATENT DOCUMENTS

CN  1732587 A  2/2006
CN  201207413 Y  3/2009
(Continued)

OTHER PUBLICATIONS

Extended European Search Report issued in European Application No. 20 808 268.5, mailed Aug. 30, 2021, 10 pages.
(Continued)

*Primary Examiner* — James Lee
(74) *Attorney, Agent, or Firm* — STERNE, KESSLER, GOLDSTEIN & FOX P.L.L.C.

(57) ABSTRACT

The present disclosure provides an electrode assembly and a related battery, battery module, wherein, the electrode assembly includes: a plurality of first type of electrode plates and at least one second type of electrode plate which are arranged in a superimposing manner, the polarity of the first type of electrode plate is opposite to the polarity of the second type of electrode plate, the plurality of first type of electrode plates comprise a first electrode plate and a second electrode plate, wherein the first electrode plate comprises a first current collector, the second electrode plate comprises a second current collector, and the first current collector is different from the second current collector.

13 Claims, 12 Drawing Sheets

(51) Int. Cl.
  *H01M 4/66* (2006.01)
  *H01M 50/209* (2021.01)
  *H01M 50/249* (2021.01)

(52) U.S. Cl.
  CPC ....... *H01M 50/209* (2021.01); *H01M 50/249* (2021.01); *H01M 2220/20* (2013.01)

(56) References Cited

U.S. PATENT DOCUMENTS

| 2006/0035152 | A1* | 2/2006 | Nishimura | H01M 10/0431 |
| | | | | 429/234 |
| 2019/0140280 | A1 | 5/2019 | Zhang et al. | |
| 2019/0140281 | A1 | 5/2019 | Li et al. | |

FOREIGN PATENT DOCUMENTS

| CN | 202308207 U | 7/2012 |
| CN | 104810561 A | 7/2015 |
| CN | 105449222 A | 3/2016 |
| CN | 107039640 A | 8/2017 |
| CN | 108428849 A | 8/2018 |
| CN | 108511761 A | 9/2018 |
| CN | 109755462 A | 5/2019 |
| CN | 109755466 A | 5/2019 |
| CN | 109755468 A | 5/2019 |
| CN | 209401755 U | 9/2019 |
| CN | 110931800 A | 3/2020 |
| CN | 108281662 B | 5/2020 |
| CN | 111326699 A | 6/2020 |
| EP | 3367485 A1 | 8/2018 |
| EP | 3 951 957 A1 | 2/2022 |
| JP | 201259497 A | 3/2012 |
| JP | 2013-164971 A | 8/2013 |
| JP | 2018116810 A | 7/2018 |
| JP | 2018-190529 A | 11/2018 |
| JP | 2020-047577 A | 3/2020 |
| WO | 2020098788 A1 | 5/2020 |

OTHER PUBLICATIONS

Notice of Reasons for Rejection issued in Japanese Application No. 2021-561777, mailed Aug. 1, 2023, 8 pages.
Examination Report issued in Indian Application No. 202217007486, mailed May 21, 2024, 7 pages.

* cited by examiner

ELECTRODE ASSEMBLY AND RELATED BATTERY, BATTERY MODULE

CROSS-REFERENCE TO RELATED APPLICATION

This application is the United States national phase of International Application No. PCT/CN2020/094041 filed on Jun. 2, 2020, the disclosures of which are hereby incorporated in their entirety by reference.

FIELD OF THE DISCLOSURE

The present disclosure relates to the field of batteries, in particular to an electrode assembly and a related battery, battery module.

BACKGROUND OF THE DISCLOSURE

Owing to such advantages as small size, high energy density, high power density, multiple cycles and long storage time, lithium-ion batteries and the like are widely used in some electronic equipment, electric transportation tools, electric toys and electric devices, for example, lithium ion batteries have been widely used in mobile phones, notebook computers, battery cars, electric vehicles, electric airplanes, electric ships, electric toy cars, electric toy ships, electric toy airplanes and electric tools.

Along with continuous development of the lithium-ion battery technology, a higher requirement is proposed on the performance of the lithium-ion battery, and as to the lithium-ion battery, a plurality of aspects of design factors are expected to be considered simultaneously.

At present, limited by the structure of an electrode assembly, current collectors of the same type of electrode plate can only be designed with the same material or structure, therefore, when the electrode assembly is designed, the flexibility is poor, then the current collectors can only be selected mainly based on major design objectives, and comprehensive performance of the battery is difficult to improve.

SUMMARY OF THE DISCLOSURE

According to a first aspect of the present disclosure, an electrode assembly is provided, including:

a plurality of first type of electrode plates and at least one second type of electrode plate which are arranged in a superimposing manner, the polarity of the first type of electrode plate is opposite to the polarity of the second type of electrode plate, and the plurality of first type of electrode plates comprise a first electrode plate and a second electrode plate; wherein the first electrode plate comprises a first current collector, the second electrode plate comprises a second current collector, and the first current collector is different from the second current collector.

In some embodiments, the first current collector comprises a first conducting layer and a protective layer which are arranged in a superimposing manner along a direction vertical to a surface on which the first type of electrode plate and the second type of electrode plate are superimposed, and the resistivity of the protective layer is greater than the resistivity of the first conducting layer.

In some embodiments, there are two protective layers respectively arranged at two sides of the first conducting layer.

In some embodiments, the material of the protective layer comprises at least one of the following: polymer matrix, conducting material and inorganic filler.

In some embodiments, the polymer matrix comprises at least one of the following: polyvinylidene fluoride polymer matrix and polyvinylidene chloride polymer matrix.

In some embodiments, two first conducting layers are respectively arranged at two sides of the protective layer.

In some embodiments, the protective layer is an insulating layer.

In some embodiments, the material of the protective layer comprises at least one of the following: organic polymer insulating materials, inorganic insulating materials and composite materials.

In some embodiments, the second current collector is composed of a second conducting layer.

In some embodiments, the material of the first conducting layer is the same as the material of the second conducting layer.

In some embodiments, the materials of the first conducting layer and the second conducting layer are both metal.

In some embodiments, the thickness of the first conducting layer is smaller than or equal to the thickness of the second conducting layer.

In some embodiments, the difference between the thickness of the first current collector and the thickness of the second current collector is no greater than 5 μm.

In some embodiments, the electrode plates at the outermost layer of the electrode assembly are the first electrode plates.

According to a second aspect of the present disclosure, a battery is provided, including:

a housing; and an electrode assembly in the above embodiments, wherein the electrode assembly is arranged in the housing.

According to a third aspect of the present disclosure, a battery module is provided, including: a plurality of batteries in the above embodiments.

BRIEF DESCRIPTION OF THE ACCOMPANYING DRAWINGS

The drawings described herein provide a further understanding of the present disclosure, and constitute a part of the present disclosure. The exemplary embodiments of the present disclosure and descriptions thereof are used for explaining the present disclosure, rather than constituting an improper limitation to the present disclosure. In the drawings.

DETAILED DESCRIPTION OF THE PREFERRED EMBODIMENTS

Figure 1:
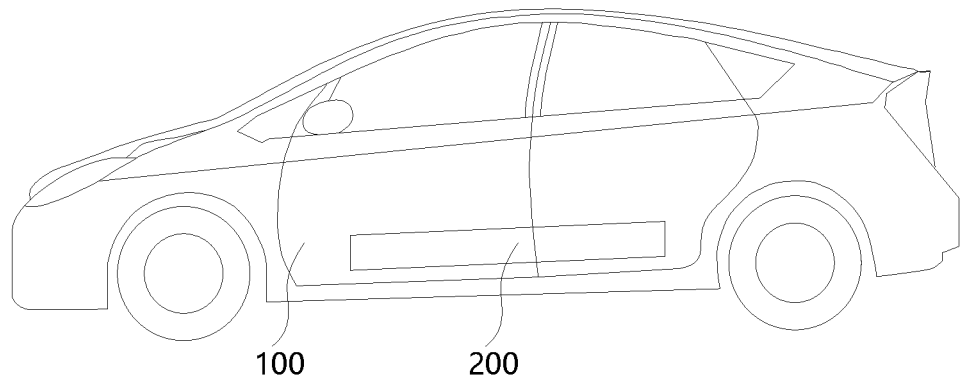
FIG. 1 is an outline schematic diagram of some embodiments of a vehicle adopting a battery of the present disclosure.

In order to make the objectives, technical solutions, and advantages of the embodiments of the present disclosure clearer, a clear and complete description of the technical solutions of the embodiments of the present disclosure will be given below in combination with accompanying drawings in the embodiments of the present disclosure. Apparently, the described embodiments are only a part but not all of the embodiments of the present disclosure. Based upon the embodiments of the present disclosure, all of the other embodiments obtained by those skilled in the art without any creative effort shall all fall within the protection scope of the present disclosure.

Unless otherwise defined, all the technical and scientific terms used in the text have the same meanings as those understood by persons skilled in the art in the technical field of the present disclosure; in the present text, the terms used in the applied description are merely for the purpose of describing specific embodiments, rather than for limiting the present disclosure; the terms "including" and "having" and any variation thereof in the description and claims and the above brief description of the drawings of the present disclosure intend to encompass non-exclusive inclusions. The terms such as "first" and "second" in the description and claims or the above drawings of the present disclosure are used for distinguishing different objects, rather than for describing a particular sequence or primary or secondary relationship.

The mentioning of "embodiment" in the present text means that specific characteristics, structures or properties described in combination with embodiments can be included in at least one embodiment of the present disclosure. The occurrence of this phrase in various positions of the description does not necessarily refer to the same embodiment, nor refer to independent or alternative embodiment which is mutually exclusive with the other embodiments. Those skilled in the art can explicitly and implicitly understand that, the embodiments described in the text can be combined with other embodiments.

The term "and/or" in the text merely describes an incidence relationship of associated objects, and represents the existence of three relationships, for example, A and/or B can represent: A exists alone, A and B exist simultaneously, B exists alone. In addition, the character "/" in the text generally represents that the front and rear associated objects are of an "or" relationship.

The term "a plurality of" in the present disclosure refers to more than two (including two), similarly, "a plurality of groups" refers to more than two groups (including two groups), and "a plurality of pieces" refers to more than two pieces (including two pieces).

The present disclosure provides an electrode assembly and a related battery, device, manufacturing method and manufacturing device, and overcomes the above problem or at least partially solves the above problem.

As to the electrode assembly of the embodiments of the present disclosure, a plurality of first type of electrode plates include a first electrode plate and a second electrode plate with different current collectors, and different current collectors can be selected for the plurality of first type of electrode plates of the same polarity according to multiple aspects of requirements of the battery, to improve flexibility of configuration of the electrode plates of the electrode assembly, and advantages of different current collectors can be integrated into the same electrode assembly, to balance the performance of various aspects of the electrode assembly, and further improve the comprehensive performance of the battery.

The electrode assembly and the manufacturing method thereof, the battery, the battery module and the battery pack described in the embodiments of the present disclosure are all applicable to various devices using batteries, for example, mobile phones, portable devices, notebook computers, battery cars, electric vehicles, ships, space vehicles, electric toys, and electric tools, etc., for example, the space vehicles include airplanes, rockets, space shuttles, and spacecrafts, etc., the electric toys include fixed or mobile electric toys, for example, game machines, electric vehicle toys, electric ship toys, electric airplane toys, etc., the electric tools include metal cutting electric tools, grinding electric tools, assembly electric tools and electric tools used in railways, for example, electric drills, electric grinders, electric wrenches, electric screw drivers, electric hammers, electric impact drills, concrete vibrators and electric planers.

The electrode assembly and the manufacturing method thereof, the battery, the battery module and the battery pack described in the embodiments of the present disclosure are not only applicable to the devices described above, but also applicable to all the devices using batteries, however, to facilitate description, electric vehicles are taken as an example for illustration in the following embodiments.

For example, FIG. 1 is a structural schematic diagram of a vehicle 100 of an embodiment of the present disclosure. The vehicle 100 can be an oil-fueled vehicle, a gas vehicle or a new-energy vehicle, and the new-energy vehicle can be a battery electric vehicle, a hybrid electric vehicle or an extended range vehicle. A battery pack 200 can be arranged inside the vehicle 100, for example, the battery pack 200 can be arranged at the bottom or the front or rear end of the vehicle 100. The battery pack 200 can be used for the power supply of the vehicle 100, for example, the battery pack 200 can serve as an operating power supply of the vehicle 100, and serve as a circuit system of the vehicle 100, for example, the battery pack 200 can satisfy power demands of the vehicle 100 during starting, navigation and operation of the vehicle 100. In another embodiment of the present disclosure, the battery pack 200 can not only serve as an operational power supply of the vehicle 100, but also serve as a driving power supply of the vehicle 100, to substitute or partially substitute fuel oil or natural gas to provide driving power for the vehicle 100.

Figure 2:
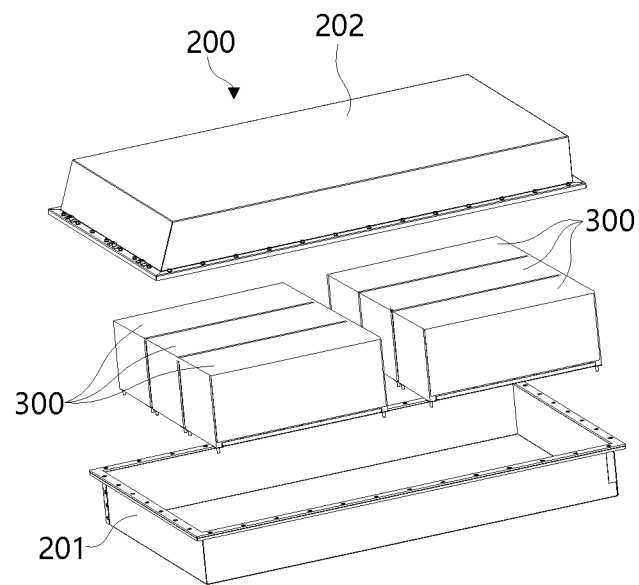
FIG. 2 is a structural schematic diagram of some embodiments of the battery pack of the present disclosure.

To satisfy different requirements of electricity use, the battery pack 200 can include one battery module or a plurality of battery modules, wherein the plurality of battery modules can be connected in series or in parallel or in series and parallel, and the connection in series and parallel refers to a combination of series connection and parallel connection. For example, FIG. 2 is a structural schematic diagram of a battery pack 200 of another embodiment of the present disclosure. The battery pack 200 includes a first housing 201, a second housing 202 and the plurality of battery modules 300, wherein the shapes of the first housing 201 and the second housing 202 are determined according to the combined shapes of the plurality of battery modules 300, the first housing 201 and the second housing 202 are both provided with an opening, for example, the first housing 201 and the second housing 202 can both be hollow cuboids with only one surface being an opening surface respectively, that is, the surface has no housing wall, such that the inside and the outside of the housing are communicated, the first housing 201 and the second housing 202 are buckled with each other at the opening to form a closed housing of the battery pack 200, and after the plurality of battery modules 300 are connected in parallel or connected in series or connected in series and parallel, the plurality of battery modules 300 are placed in the housing formed after the first housing 201 is buckled with the second housing 202.

In another embodiment of the present disclosure, when the battery pack 200 includes one battery module 300, the battery module 300 is placed in the housing formed after the first housing 201 is buckled with the second housing 202.

The electricity generated through the one or more battery modules 300 penetrates through the housing through a conducting mechanism (not shown in the figure) and is led out.

Figure 3:
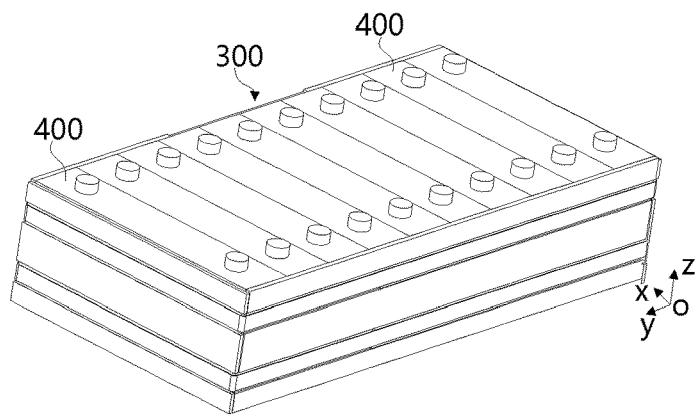
FIG. 3 is a structural schematic diagram of some embodiments of the battery module of the present disclosure.

According to different power demands, the battery module 300 can include one or more batteries, as shown in FIG. 3, the battery module 300 includes a plurality of batteries 400, and a plurality of batteries 400 can be connected through a manner of series connection, parallel connection or series and parallel connection, to realize a large capacity or power. For example, the battery 400 includes, but is not limited to, a lithium ion secondary battery, a lithium ion primary battery, a lithium sulfur battery, a sodium lithium ion battery, or a magnesium ion battery. The battery 400 can be cylindrical, flat, rectangle or of other shapes.

In another embodiment of the present disclosure, the plurality of batteries 400 can be superimposed together, and the plurality of batteries 400 can be connected in series, in parallel or in series and parallel. In another embodiment of the present disclosure, each battery 400 can be square, cylindrical or of other shapes.

Figure 4:
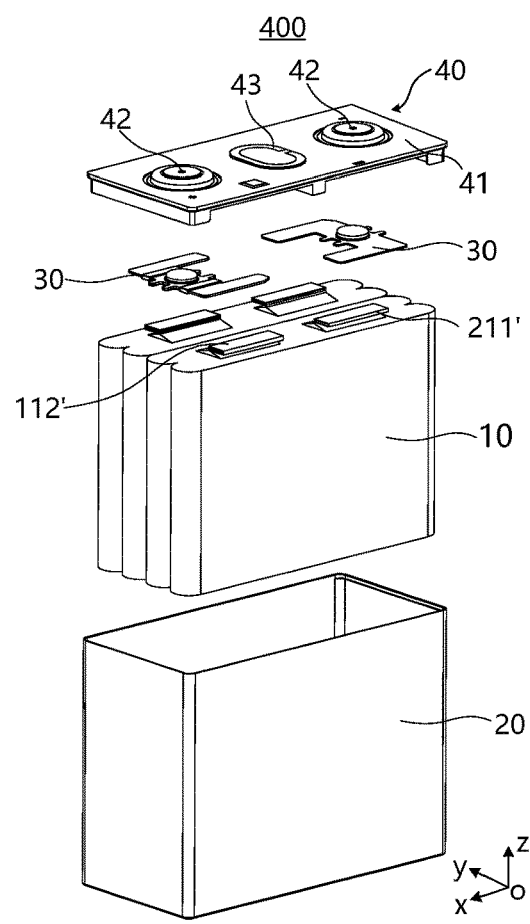
FIG. 4 is an exploded view of some embodiments of a battery of the present disclosure.

For example, FIG. 4 is a structural schematic diagram of a battery 400 of another embodiment of the present disclosure, the battery 400 includes one or more electrode assemblies 10, a housing 20 and an end cover assembly 40. The shape of the housing 20 can be determined according to the combined shapes of one or more electrode assemblies 10, for example, the housing 20 can be a hollow cuboid or cube or cylinder, moreover, one of the surfaces of the housing 20 is provided with an opening, such that one or more electrode assemblies 10 can be placed in the housing 20, for example, when the housing 20 is a hollow cuboid or cube, one of the planes of the housing 20 is an opening surface, that is, the plane has no housing wall, such that the inside and the outside of the housing 20 are communicated, when the housing 20 can be a hollow cylinder, the circular side face of the housing 20 is an opening surface, that is, the circular side face has no housing wall, such that the inside and the outside of the housing 20 are communicated. The end cover assembly 40 is connected with the housing 20 at the opening of the housing 20 to form a closed housing to place the battery 400, and the housing 20 is internally filled with electrolyte.

The end cover assembly 40 includes an end cover 41 and two terminals 42, the end cover 41 is basically flat, two terminals 42 are arranged on the flat surface of the end cover 41 and penetrate through the flat surface of the end cover 41, the two terminals 42 are respectively a positive terminal and a negative terminal, each terminal 42 is correspondingly provided with a collector member 30, and the collector member 30 is arranged between the end cover 41 and the electrode assembly 10.

For example, as shown in FIG. 4, each electrode assembly 10 is provided with a first type of tab 112' and a second type of tab 211', the first type of tab 112' of one or more electrode assemblies 10 is connected with a first terminal through one collector member 30, and the second type of tab 211' of the one or more electrode assemblies 10 is connected with the second terminal through another collector member 30.

In another embodiment of the present disclosure, the flat surface of the end cover 41 can further be provided with an anti-explosion valve 43, the anti-explosion valve 43 can be a part of the flat surface of the end cover 41, and can also be welded with the flat surface of the end cover 41. For example, the anti-explosion valve 43 has a nick, and the depth of the nick is smaller than the thickness of other areas, except the nick, of the anti-explosion valve 43, to achieve the purpose of not penetrating through the flat surface of the end cover 41, that is, under normal states, the anti-explosion valve 43 is in sealed combination with the end cover 41, the end cover assembly 40 is connected with the housing 20 at the opening of the housing 20 through the end cover 41 to form a housing for placing the battery 400, and the space formed by the housing is sealed and airtight. In the housing, when the battery 400 produces too much gas, and when the gas expands such that the air pressure in the housing rises to exceed a preset value, the anti-explosion valve 43 is cracked at the nick and the inside and the outside of the housing are communicated, and gas is released outwards through the cracking point of the anti-explosion valve 43, to further avoid explosion.

In the battery 400, according to actual use demands, a single or the plurality of electrode assemblies 10 can be arranged, and as shown in FIG. 4, the battery 400 is internally provided with at least two independent electrode assemblies 10.

In the battery 400, the electrode assembly 10 can be of a winding structure, and can also be of a laminated structure, and the electrode assembly 10 being a winding structure will be taken as an example for illustration in each of the following embodiments.

Figure 5:
FIG. 5 is a side view of some embodiments after an electrode assembly of the present disclosure is flattened.

In another embodiment of the present disclosure, the electrode assembly 10 is of a winding structure, as shown in FIG. 5, the electrode assembly 10 can include: a plurality of first type of electrode plates 1 and at least one second type of electrode plate 2 arranged in a superimposing manner, the polarity of the first type of electrode plate 1 is opposite to the polarity of the second type of electrode plate 2, and the plurality of first type of electrode plates 1 include a first electrode plate 11 and a second electrode plate 12.

For example, the plurality of first type of electrode plates 1 can be at least two positive electrode plates, correspondingly, at least one second type of electrode plate 2 is at least one negative electrode plate; or, the plurality of first type of electrode plates 1 can be at least two negative electrode plates, correspondingly, the at least one second type of electrode plate 2 is at least one positive electrode plate. The number of the plurality of first type of electrode plates 1 can be 2, 3 or 4, and the number of at least one second type of electrode plate 2 can be 1, 2, 3 or 4, and so on.

Figure 6:
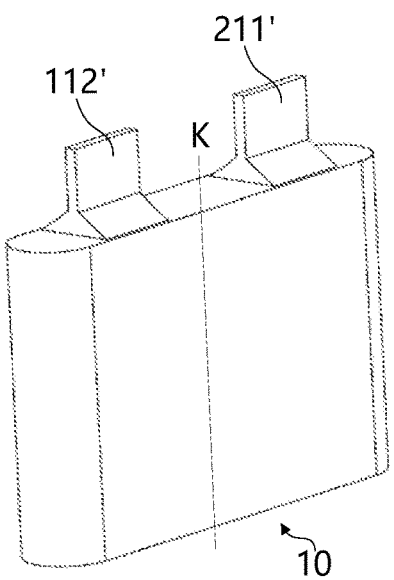
FIG. 6 is a structural schematic diagram of some embodiments of an electrode assembly of the present disclosure.

In another embodiment of the present disclosure, the shape of each first type of electrode plate 1 is basically the same as the shape of each second type of electrode plate 2, for example, after the winding structure is flattened, the first type of electrode plate 1 and the second type of electrode plate 2 are basically strip-shaped, for example, the first type of electrode plate 1 and the second type of electrode plate 2 can be strip-shaped with a length of 5-20 m. The length difference between the first type of electrode plate 1 and the second type of electrode plate 2 is within a preset range, and the width sizes are basically the same. As shown in FIG. 6, after the plurality of first type of electrode plates 1 and at least one second type of electrode plate 2 are superimposed, a winding structure can be obtained when the plurality of first type of electrode plates 1 and at least one second type of electrode plate 2 are wound along a strip direction. The winding structure has a winding axis K, and the superimposing surface in which the at least one positive electrode plate 1 is superimposed with the at least one negative electrode plate 2 is basically in parallel with the winding axis K.

In another embodiment of the present disclosure, the plurality of first type of electrode plates 1 and at least one second type of electrode plate 2 are superimposed in the plurality of forms, for example, when the plurality of first type of electrode plates 1 are two or more first type of electrode plates 1 and at least one second type of electrode plate 2 is one or more second type of electrode plates 2, after the winding structure is flattened, one first type of electrode plate 1 and one second type of electrode plate 2 can be superimposed alternately in sequence, every two or more first type of electrode plates 1 and one second type of electrode plate 2 can be superimposed alternately in sequence, and one first type of electrode plate 1 and every two or more second type of electrode plates 2 can be superimposed alternately in sequence. The superimposing between the plurality of first type of electrode plates 1 and the plurality of second type of electrode plates 2 can also be understood as that at least one second type of electrode plate 2 is arranged between every two adjacent first type of electrode plates 1, or, the plurality of first type of electrode plates 1 are arranged between every two adjacent second type of electrode plates 2.

When the plurality of first type of electrode plates 1 are superimposed with at least one second type of electrode plate 2, a diaphragm 3 is further arranged between any adjacent one positive electrode plate 1 and one negative electrode plate 2, and the diaphragm 3 is configured to separate the adjacent first type of electrode plate 1 from the second type of electrode plate 2, such that the adjacent positive electrode plate and the negative electrode plate are not in short circuit with each other. In another embodiment of the present disclosure, electrode plates of different polarities are adjacent to each other, that is, the first type of electrode plate 1 being adjacent to the second type of electrode plate 2 means that no other electrode plate but at least one layer of diaphragm 3 exists between the first type of electrode plate 1 and the second type of electrode plate 2, for example, no other first type of electrode plate 1 or second type of electrode plate 2 exists between the first type of electrode plate 1 and the second type of electrode plate 2, and can also be understood as that the first type of electrode plate 1 and the second type of electrode plate 2 are most directly adjacent to each other, for example, on the basis of one electrode plate with one polarity (for example, the first type of electrode plate 1), the electrode plate with a polarity and the first layer of electrode plate with different polarity (for example, the second type of electrode plate 2) adjacent to the electrode plate with the polarity are called adjacent electrode plates.

In another embodiment of the present disclosure, two electrode plates of the same polarity being adjacent means that only one electrode plate of other polarity exists between two electrode plates of the same polarity, for example, two first type of electrode plates 1 being adjacent means that only one second type of electrode plate 2 exists between two first type of electrode plates 1, and two second type of electrode plates 2 being adjacent means that only one first type of electrode plate 1 exists between two second type of electrode plates 2. In another embodiment of the present disclosure, when no other electrode plate of a different polarity exists between two electrode plates of the same polarity, the two electrode plates of the same polarity can be taken as one electrode plate.

In another embodiment of the present disclosure, when no other electrode plates of a different polarity and diaphragms exist between two or more electrode plates of the same polarity, the two electrode plates of the same polarity can be taken as one group of electrode plates, then during superimposing, the electrode plate group of the same polarity and another electrode plate group of a different polarity or a single electrode plate are superimposed alternately in sequence, for example, two or more positive electrode plates constitute a positive electrode plate group, and two or more negative electrode plates constitute a negative electrode plate group. The superimposing can be as follows: the positive electrode plate group and the negative electrode plate group are superimposed alternately in sequence, the positive electrode plate group and a single negative electrode plate are superimposed alternately in sequence, or, the negative electrode plate group and the positive electrode plate group are superimposed alternately in sequence, and the negative electrode plate group and the single positive electrode plate are superimposed alternately in sequence.

Since the electrode plate group of the same polarity can be taken as one electrode plate, therefore, to facilitate description, one electrode plate described subsequently not only can be a single electrode plate, but also can be an electrode plate group composed of a plurality of electrode plates of the same polarity.

However, regardless of the superimposing manners, at least one layer of diaphragm 3 is arranged between adjacent electrode plates of different polarities.

In another embodiment of the present disclosure, the diaphragm 3 includes a diaphragm base layer and a functional layer, wherein the diaphragm base layer can be at least one selected from polypropylene, polyethylene, ethylene-propylene copolymer, and polybutylene terephthalate, and the functional layer can be a mixture layer of ceramic oxides and binder. In another embodiment of the present disclosure, after the winding structure is flattened, the diaphragm 3 is a thin film which exists separately, and is basically strip-shaped, for example, a strip shape with a length of 5-20 m. In another embodiment of the present disclosure, the diaphragm 3 is coated on the surface of the first type of electrode plate 1 or the second type of electrode plate 2, that is, the diaphragm 3 and the first type of electrode plate 1 or the second type of electrode plate 2 are of an integrated structure.

To facilitate description, one first type of electrode plate 1 and one second type of electrode plate 2 being superimposed in sequence and one diaphragm 3 being arranged between adjacent first type of electrode plate 1 and second type of electrode plate 2 are taken as an example for illustration in the following embodiments. For example, the electrode assembly 10 includes: two first type of electrode plates 1 and two second type of electrode plates 2, before winding, each first type of electrode plate 1 and each second type of electrode plate 2 can both be of a strip structure, two first type of electrode plates 1 and two second type of electrode plates 2 are superimposed in the thickness direction of the electrode plate, and a diaphragm 3 is arranged between any adjacent first type of electrode plate 1 and the second type of electrode plate 2, that is, one first type of electrode plate 1 and one second type of electrode plate 2 are superimposed alternately in sequence, and a diaphragm 3 is arranged between adjacent first type of electrode plate 1 and a second type of electrode plate 2, and the superimposing plane in which two first type of electrode plates 1 are superimposed with two second type of electrode plates 2 is basically in parallel with the winding axis K of the winding structure of the electrode assembly 10.

Figure 7:
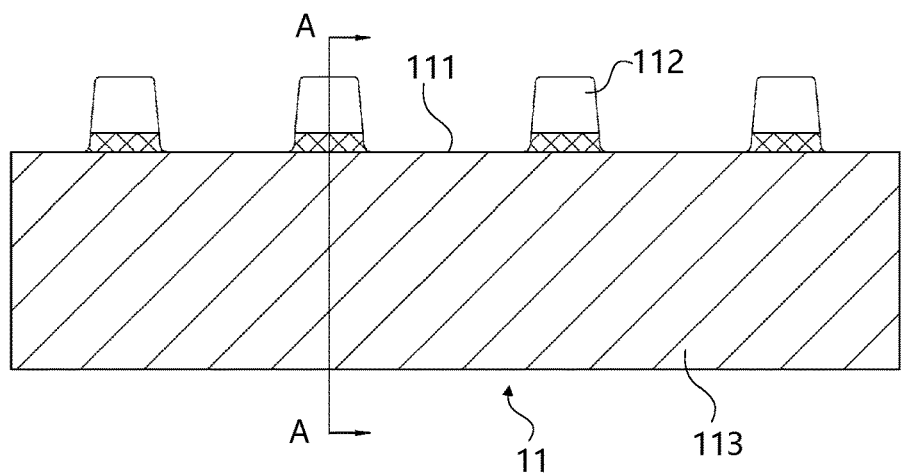
FIG. 7 is a structural schematic diagram of some embodiments of a first electrode plate in an electrode assembly of the present disclosure.
Figure 8:
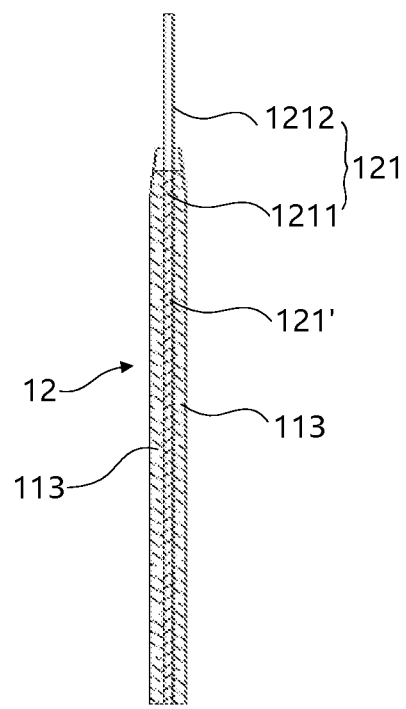
FIG. 8 is a sectional view of some embodiments of a second electrode plate in an electrode assembly of the present disclosure.

In the above electrode assembly 10, as shown in FIG. 7 and FIG. 8, the plurality of first type of electrode plates 1 include a first electrode plate 11 and a second electrode plate 12, wherein the first electrode plate 11 includes a first current collector 111, the second electrode plate 12 includes a second current collector 121, and the first current collector 111 is different from the second current collector 121.

Wherein the first current collector 111 being different from the second current collector 121 can include at least one of the following conditions: the thicknesses and shapes of the first current collector 111 and the second current collector 121 along a direction vertical to a surface on which the first type of electrode plate 1 and the second type of electrode plate 2 superimposed are different; for superimposing layers which are arranged in a superimposing manner along the direction vertical to a surface on which the first type of electrode plate 1 and the second type of electrode plate 2 are superimposed, materials and/or number are different, the conditions of whether punching or not are different, the number of punched holes is different, the ranges of the active substance areas are different, the conditions of whether an insulating area exists between the active substance area and the tab are different, the ranges of insulating areas between the active substance area and the tab are different, the conditions of whether a protective layer is provided are different, and the materials are different.

In another embodiment of the present disclosure, the first current collector 111 and the second current collector 121 can be coated with a first type of active substance layer 113, and the first type of active substance layer 113 on the first current collector 111 and the second current collector 121 can be the same or different. When the first type of active substance layer 113 is a positive active substance layer, the first type of active substance layer 113 can be ternary materials, lithium manganate or lithium iron phosphate; and when the first type of active substance layer 113 is a negative active substance layer, the first type of active substance layer 113 can be graphite or silicon.

Figure 9:
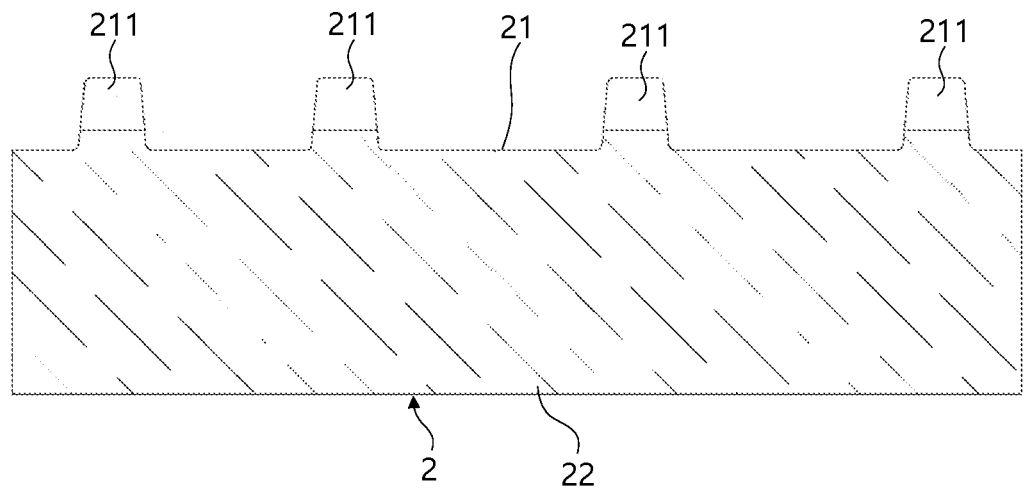
FIG. 9 is a structural schematic diagram of some embodiments of a second type of electrode plate in an electrode assembly of the present disclosure.

As shown in FIG. 9, the second type of electrode plate 2 includes a third current collector 21 and a second active substance layer 22 coated on the third current collector 21. When the first active substance layer 113 is a positive active substance layer, the second type of active substance layer 22 is a negative active substance layer; and when the first type of active substance layer 113 is a negative active substance layer, the second type of active substance layer 22 is a positive active substance layer.

In the electrode assembly 10 of an embodiment of the present disclosure, the plurality of first type of electrode plates 1 include the first electrode plate 11 and the second electrode plate 12 having different current collectors, and different current collectors 111 can be selected for the first type of electrode plate 1 of the same polarity according to many aspects of demands of the electrode assembly 10 in process, safety or using performance, which can improve the flexibility of structure configuration of the electrode assembly 10, so as to integrate advantages of different current collectors to the same electrode assembly 10, and balance many aspects of performances of the electrode assembly 10, and further improve the comprehensive performance of the battery 400.

Figure 10:
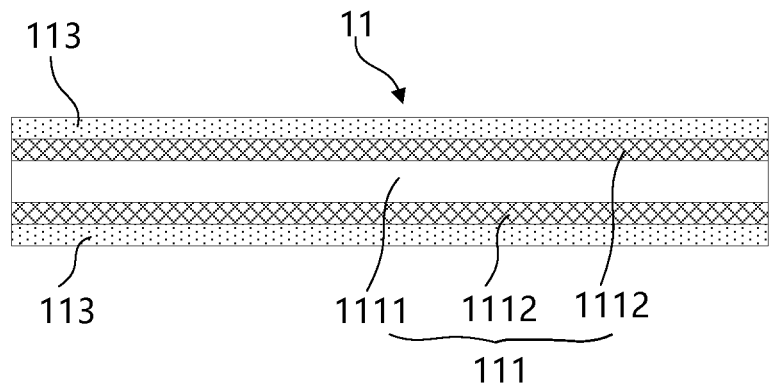
FIG. 10 is a sectional view of some embodiments of a first electrode plate in an electrode assembly of the present disclosure.

In another embodiment of the present disclosure, as shown in FIG. 10, the first current collector 111 includes a first conducting layer 1111 and a protective layer 1112 which are arranged in a superimposing manner along the direction vertical to a surface on which the first type of electrode plate 1 and the second type of electrode plate 2 are superimposed, that is, the first current collector 111 adopts a multilayered structure in a superimposing direction, the first active substance layer 113 is arranged on the protective layer 1112, and is in contact with the protective layer 1112. The resistivity of the protective layer 1112 is greater than the resistivity of the first conducting layer 1111. Since the resistance of the first current collector 111 is related to the resistivity, the length and cross sectional area, through setting a protective layer 1112 with a large resistivity, the resistance of the first current collector 111 can be increased.

When the battery 400 is in short circuit during abnormal conditions, due to internal short circuit, the internal resistance of the battery 400 will be greatly reduced. In the present disclosure, through increasing the resistance of the first current collector 111, the internal resistance of the battery 400 after short circuit can be increased, thereby improving the safety performance of the battery 400. In addition, in the present disclosure, the short circuit heat production can be controlled in a range in which produced heat can be completely absorbed by the battery 400, therefore, the heat produced at the site point of internal short circuit can be completely absorbed by the battery 400, thereby leading to a small temperature rise of the battery 400, limiting the influence of the short circuit damage on the battery 400 to a "point" range, and only forming "point circuit". The temperature rise of the battery caused by short circuit heat production is also not obvious, and normal use of the battery in a short time is not influenced.

In another embodiment of the present disclosure, as shown in FIG. 10, there are two protective layers 1112 respectively arranged at two sides of the conducting layer 1111, for example, two superimposing surfaces of the conducting layer 1111. A first active substance layer 113 is arranged on a side face, far away from the conducting layer 1111, of the two protective layers 1112. In addition, the number of the protective layer 1112 can also be one and the protective layer 1112 can be arranged at one side of the conducting layer 1111, for example, one of the superimposing surfaces of the conducting layer 1111.

For example, the material of the protective layer 1112 includes: polymer matrix, conducting material and inorganic filler.

Wherein the polymer matrix is at least one selected from polyvinylidene fluoride and polyvinylidene chloride polymer matrix. The polyvinylidene fluoride of the polymer matrix material of the protective layer 1112 includes polyvinylidene fluoride (PVDF) and modified PVDF, and polyvinylidene chloride includes polyvinylidene chloride (PVDC) and modified PVDC. For example, polyvinylidene fluoride and/or polyvinylidene chloride can be selected from PVDF, carboxylic acid modified PVDF, acrylic acid modified PVDF, PVDF copolymer, PVDC, carboxylic acid modified PVDC, acrylic acid modified PVDC, PVDC copolymer or any arbitrary mixture thereof.

The polymer matrix in the present embodiment plays a role of a positive temperature coefficient (PTC for short) thermistor layer, and can not only serve as a PTC matrix, but also serve as a binder, thereby on the one hand avoiding influences on adhesion of the coating, response temperature and response speed of the PTC effect due to different materials of the binder and PTC matrix, and on the other hand being beneficial for preparing a thin protective layer 1112 without influencing the adhesion of the protective layer 1112.

Secondly, the protective layer 1112 composed of polyvinylidene fluoride and/or polyvinylidene chloride materials and the conducting materials can play a role of a PTC thermistor layer, the operating temperature range is proper, and can be 80° C. to 160° C., thereby better improving high-temperature safety performance of the battery 400.

In addition, solvent (for example N-methyl pyrrolidone, NMP for short) or electrolyte in the first type of active substance layer 113 at the upper layer of the protective layer 1112 will have such unfavorable influences as dissolving and swelling on the polymer materials in the protective layer 1112, and as to the protective layer 1112 containing PVDF at only an amount of binder, the adhesion easily becomes poor; while as to the protective layer 1112 of the present disclosure, since the content of polyvinylidene fluoride and/or polyvinylidene chloride is large, therefore, the unfavorable influence can be reduced.

The conducting materials can be selected from at least one of conducting carbon-based material, conducting metal material and conducting polymer material, wherein the conducting carbon-based material is selected from at least one of conducting carbon black, acetylene black, graphite, graphene, carbon nano tube, and carbon nanofiber; the conducting metal material is selected from at least one of Al powder, Ni powder and gold powder; and the conducting polymer material is selected from at least one of conducting polythiophene, conducting polypyrrole, and conducting polyaniline The conducting material can separately use one type or can use more than two types in a combined manner.

The inorganic filler can be selected from at least one of magnesium oxide, aluminum oxide, titanium dioxide, zirconium oxide, silicon dioxide, silicon carbide, boron carbide, calcium carbonate, aluminium silicate, calcium silicate, potassium titanate, barium sulfate, lithium cobalt oxide, lithium manganate, lithium nickelate, lithium nickel manganese oxide, lithium nickel cobalt manganese oxide, lithium nickel aluminum manganese oxide, lithium iron phosphate, lithium vanadium phosphate, lithium cobalt phosphate, lithium manganese phosphate, lithium iron silicate, lithium vanadium silicate, lithium cobalt silicate, lithium manganese silicate, and lithium titanate, or at least one of conducting carbon coated modified material, conducting metal coated modified material or conducting polymer coated modified material of the above materials.

Figure 11:
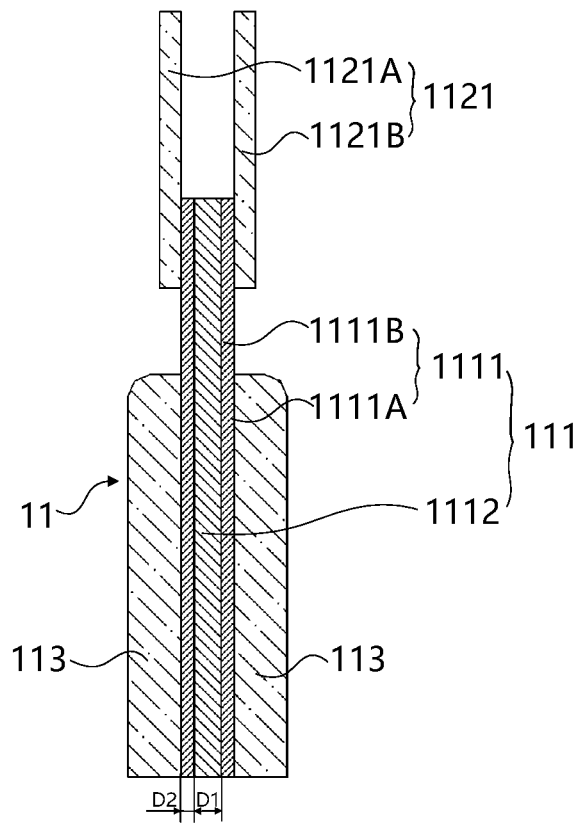
FIG. 11 and FIG. 12 are respectively A-A sectional views of two embodiments shown in FIG. 7.
Figure 12:
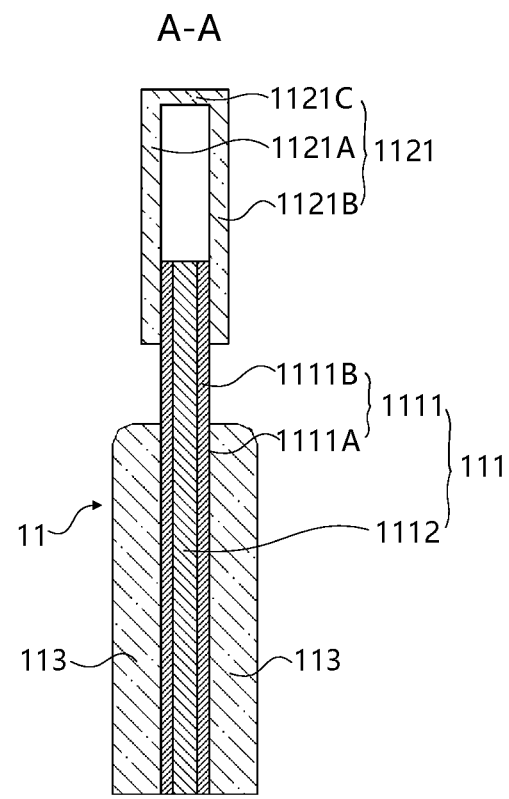
Figure 13:
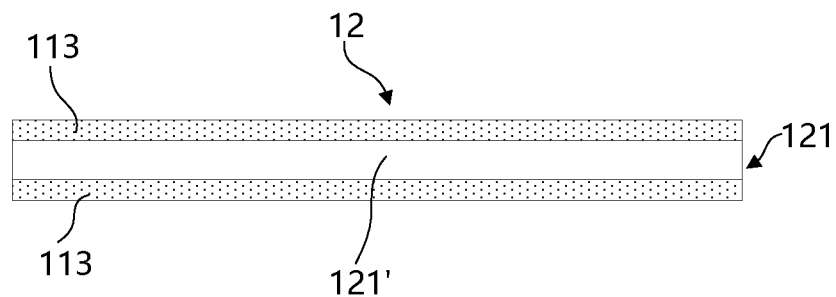
FIG. 13 is a sectional view of some embodiments of a second electrode plate in an electrode assembly of the present disclosure.

In another embodiment of the present disclosure, as shown in FIG. 11, there are two conducting layers 1111 respectively arranged at two sides of the protective layer 1112, for example, two superimposing surfaces of the protective layer 1112. The protective layer 1112 is configured to bear the conducting layer 1111, to support and protect the conducting layer 1111; the conducting layer 1111 is configured to bear the first type of active substance layer 113, to provide electrons for the first type of active substance layer 113, that is, to play a role of conducting electricity and collecting current. The conducting layer 1111 can also be arranged at one side of the protective layer 1112, for example, one of the superimposing surfaces of the protective layer 1112.

When the battery 400 is in short circuit during abnormal conditions, due to internal short circuit, the internal resistance of the battery 400 will be greatly reduced. In the present disclosure, through increasing the resistance of the first current collector 111, the internal resistance of the battery 400 after short circuit can be increased, thereby improving the safety performance of the battery 400. In the present disclosure, the influence of the short circuit damage on the battery 400 can be limited to a "point" range, that is, the influence of the short circuit damage on the battery 400 can be limited to the damage point, moreover, the following characteristic is called "point open circuit": the short circuit current is greatly reduced due to the high resistance of the first current collector 111, the temperature rise of the battery is not obvious due to short circuit heat production, and the normal use of the battery within a short time is not influenced.

In another embodiment of the present disclosure, the protective layer 1112 can be an insulating layer. Since the density of the insulating layer is smaller than that of the metal, therefore, the first current collector 111 of the present disclosure can improve the weight energy density of the battery 400 while improving the safety performance of the battery 400. Moreover, since the insulating layer can well bear and protect the conducting layer 1111 arranged on the surface of the insulating layer, thereby avoiding cracking of electrode plates.

For example, the material of the protective layer 1112 can be selected from at least one of organic polymer insulating materials, inorganic insulating materials, and composite materials.

Wherein, the organic polymer insulating material is preferably selected from at least one of polyamide, polyterephthalate, polyimide, polyethylene, polypropylene, polystyrene, polyvinyl chloride, acrylonitrile-butadiene-styrene copolymer, polybutylene terephthalate, poly-p-phenylene terephthamide, polystyrene, polyformaldehyde, epoxy resin, phenolic resin, polytetrafluoroethylene, polyvinylidene fluoride, silicone rubber and polycarbonate.

The inorganic insulating material is preferably selected from at least one of aluminium oxide, silicon carbide, and silicon dioxide.

The composite material is preferably selected from at least one of epoxy resin glass fiber reinforced composite material and polyester resin glass fiber reinforced composite material.

In another embodiment of the present disclosure, as shown in FIG. 11, the thickness of the protection layer 1112 is D1, D1 satisfies the formula of 1 μm≤D1≤50 μm. For example, the upper limit of the thickness D1 of the protective layer 1112 can be 50 μm, 45 μm, 40 μm, 35 μm, 30 μm, 25 μm, 20 μm, 15 μm, 12 μm, 10 μm, 8 μm, the lower limit of the thickness D1 of the protective layer 1112 can be 1 μm, 1.5 μm, 2 μm, 3 μm, 4 μm, 5 μm, 6 μm, 7 μm; and the range of the thickness D1 of the protective layer 1112 can be composed of any numerical value of the upper limit or the lower limit.

Optionally, D1 satisfies the formula of 2 μm≤D1≤30 μm; for example, 5 μm≤D1≤20 μm.

In the above embodiment, the material of the conducting layer 1111 is metal. For example, the metal conducting material can be selected from at least one of aluminium, copper, nickel, titanium, silver, nickel-copper alloy, and aluminium zirconium alloy.

In another embodiment of the present disclosure, as shown in FIG. 11, the thickness D2 of the conducting layer 1111 satisfies the formula of 1 nm≤D2≤1 μm. In the present disclosure, the upper limit of the thickness D2 of the protective layer 1111 can be 1 μm, 900 nm, 800 nm, 700 nm, 600 nm, 500 nm, 450 nm, 400 nm, 350 nm, 300 nm, 250 nm, 200 nm, 150 nm, 120 nm, 100 nm, 80 nm, 60 nm, the lower limit of the thickness D2 of the protective layer 1111 can be 1 nm, 5 nm, 10 nm, 15 nm, 20 nm, 25 nm, 30 nm, 35 nm, 40 nm, 45 nm, 50 nm, 55 nm; and the range of the thickness D2 of the protective layer 1111 can be composed of any numerical value of the upper limit or the lower limit.

Optionally, the thickness D2 of the conducting layer 1111 satisfies the formula of 20 nm≤D2≤500 nm, for example, 50 nm≤D2≤200 nm.

With the conducting layer 1111 adopting aluminum as an example, if the first electrode plate 11 is a positive electrode plate, generally, the current collector of the positive electrode plate adopts aluminum, when the battery is in short circuit under abnormal conditions, heat generated at the short circuit point can lead to a violent aluminothermic reaction, so as to generate a large amount of heat and lead to such accidents as explosion of the battery. While as to the first current collector 111 in the present disclosure, only the conducting layer 1111 is set to be made of an aluminium material, the amount of aluminum is only of a nanoscale thickness, thereby greatly reducing the amount of aluminum in the first current collector 111, avoiding generation of aluminothermic reaction, and dramatically improving the safety performance of the battery 400.

The electrode assembly 10 can include the plurality of first type of electrode plates 1 and at least one second type of electrode plate 2, however, to facilitate description, in the following embodiments, the electrode assembly 10 including two first type of electrode plates 1, two second type of electrode plates 2 and a plurality of diaphragms 3 is taken as an example for illustration.

The external shape of the winding structure of the electrode assembly 10 can be a cylindrical shape, a flat shape, an ellipsoid shape, a cube shape, a cuboid shape or other arbitrary shapes, however, to facilitate description, the winding structure of the electrode assembly 10 being a flat shape and a cylindrical shape is taken as an example for illustration below.

Figure 14:
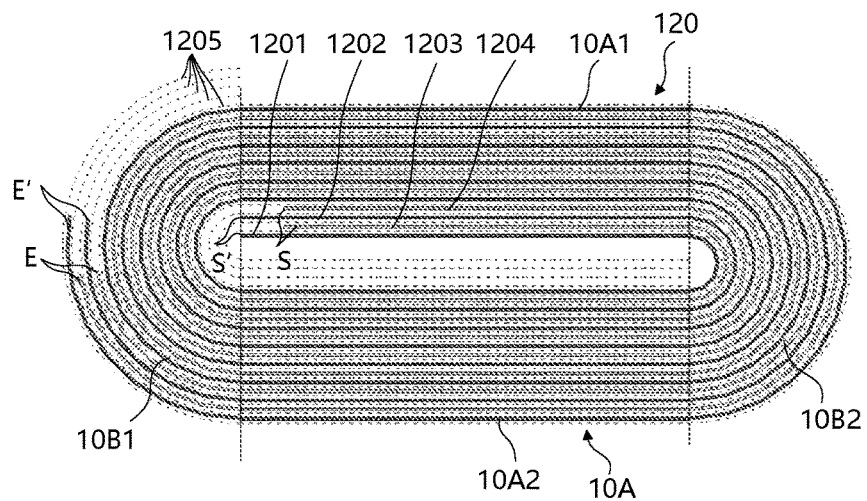
FIG. 14, FIG. 15, FIG. 16, FIG. 17 and FIG. 18 are respectively sectional views of a first embodiment, a second embodiment, a third embodiment, a fourth embodiment and a fifth embodiment of a flat electrode assembly of the present disclosure in a plane vertical to a winding axis.

FIG. 14 is a structural schematic diagram showing that a flat electrode assembly is vertical to the cross section of the winding axis K in another embodiment of the present disclosure. The first type of electrode plate is a positive electrode plate, the second type of electrode plate is a negative electrode plate, the electrode assembly 120 includes a first negative electrode plate 1201, a second negative electrode plate 1202, a first positive electrode plate 1203, a second positive electrode plate 1204 and a plurality of diaphragms 1205, wherein the first negative electrode plate 1201, the first positive electrode plate 1203, the second negative electrode plate 1202 and the second positive electrode plate 1204 are superimposed alternately in sequence, and the first negative electrode plate 1201 is separated from the first positive electrode plate 1203 through a diaphragm 1205, the first positive electrode plate 1203 is separated from the second negative electrode plate 1202 through another diaphragm 1205, the second negative electrode plate 1202 is separated from the second positive electrode plate 1204 through another diaphragm 1205, and all the first negative electrode plates 1201, the second negative electrode plates 1202, the first positive electrode plates 1203, the second positive electrode plates 1204 and the plurality of diaphragms 1205 are superimposed and then wound around a winding axis K to form a flat winding structure.

In the electrode assembly 120 in the present embodiment, as to the structures and positions of the positive tab parts of the first positive electrode plate 1203 and the second positive electrode plate 1204 and the negative tab parts of the first negative electrode plate 1201 and the second negative electrode plate 1202, please refer to the related contents of the positive tab parts and the negative tab parts described in the embodiments of the above FIG. 6 to FIG. 13, which will not be repeated redundantly herein.

In the present embodiment, as to the following specific conditions: on different radial directions of the winding structure of the electrode assembly 120, that is, at different positions of the circumferential direction of the winding structure, the difference between the number of layers of electrode plates is no greater than the number of preset layers, please also refer to the related contents described in the embodiments of the above FIG. 6 to FIG. 13, which will not be repeated redundantly herein.

As to the electrode assembly 120 of the present embodiment, the negative active substance area respectively included in the first negative electrode plate 1201 and the second negative electrode plate 1202 can be the same as the negative active substance area included in the negative electrode plate described in the above embodiments of FIG. 6 to FIG. 13, and the positive active substance area respectively included in the first positive electrode plate 1203 and the second positive electrode plate 1204 can be the same as the positive active substance area included in the positive electrode plate described in the above embodiments of FIG. 6 to FIG. 13, which will not be repeated redundantly herein.

As to the electrode assembly of the present embodiment, the first negative electrode plate 1201 and the second negative electrode plate 1202 can adopt different current collectors, and/or the first positive electrode plate 1203 and the second positive electrode plate 1204 can also adopt different current collectors. As to the structural form and material adopted by each current collector of each electrode plate, the thickness relationship of the current collectors of the electrode plates of the same polarity, the thickness of each layer when the electrode plate is of a multilayered structure, please refer to the current collectors described in the embodiments of the above FIG. 6 to FIG. 13, which will not be repeated redundantly herein.

In the winding structure, the innermost ring of the winding structure is a ring enclosed by the first electrode plate 1201, and the outermost ring of the winding structure is the ring enclosed by the second negative electrode plate 1202.

In the present embodiment, the winding structure of the electrode assembly 120 includes a flattening area 10A and turning areas 10B arranged at two sides of the flattening area 10A, wherein the superimposing surface of the electrode plate in the flattening area 10A is a basically parallel plane and is basically in parallel with the winding axis, the plane herein is not exactly a plane, and a certain error is allowed. In a plane vertical to the winding axis K, the flattening area 10A includes a first sub-flattening area 10A1 and a second sub-flattening area 10A2 which are basically parallel and distributed symmetrically along the winding axis K, and the two turning areas 10B are respectively arranged in the first sub-flattening area 10A1 and the second sub-flattening area 10A2 to combine into two sides of the flattening area 10A.

The positions of the first winding initial ends S of the first positive electrode plate 1203 and the second positive electrode plate 1204 are the same, for example, the first winding initial ends S of the first positive electrode plate 1203 and the second positive electrode plate 1204 are both arranged in the sub-flattening area (for example, the first sub-flattening area 10A1) on the same side of the flattening area 10A, and the first winding initial ends S of the first positive electrode plate 1203 and the second positive electrode plate 1204 are flush.

The positions of the second winding initial ends S' of the first negative electrode plate 1201 and the second negative electrode plate 1202 are also the same, for example, the second winding initial ends S' of the first negative electrode plate 1201 and the second negative electrode plate 1202 are both arranged in the sub-flattening area (for example, the first sub-flattening area 10A1) on the same side of the flattening area 10A, and the second winding initial ends S' of the first negative electrode plate 1201 and the second negative electrode plate 1202 are flush.

Along a reverse direction of the winding direction, the second winding initial end S' of the first negative electrode plate 1201 exceeds the first winding initial end S of the first positive electrode plate 1204. The second winding initial end S' of the second negative electrode plate 1202 exceeds the first winding initial end S of the second positive electrode plate 1203.

The positions of the first winding tail ends E of the first positive electrode plate 1203 and the second positive electrode plate 1204 are the same, for example, the first winding tail ends E of the first positive electrode plate 1203 and the second positive electrode plate 1204 are both arranged at the turning area (for example, the first turning area 10B1) on the same side, and the first winding tail ends E of the first positive electrode plate 1203 and the second positive electrode plate 1204 are flush.

The positions of the second winding tail ends E' of the first negative electrode plate 1201 and the second negative electrode plate 1202 are also the same, for example, the second winding tail ends E' of the first negative electrode plate 1201 and the second negative electrode plate 1202 are both arranged in the turning area (for example, the first turning area 10B1) on the same side, and are also arranged at the turning area (for example, the first turning area 10B1) of the same side as the first winding tail ends E of the first positive electrode plate 1203 and the second positive electrode plate 1204, and the second winding tail ends E' of the first negative electrode plate 1201 and the second negative electrode plate 1202 are flush.

Along a winding direction, the second winding tail end E' of the first negative electrode plate 1201 exceeds the first winding tail end E of the second positive electrode plate 1204. The second winding tail end E' of the second negative electrode plate 1202 exceeds the first winding tail end E of the first positive electrode plate 1203.

The winding structure of the electrode assembly described above can enable the length differences of a plurality of electrode plates before winding to be approximate, thereby being easy to wind.

Figure 15:
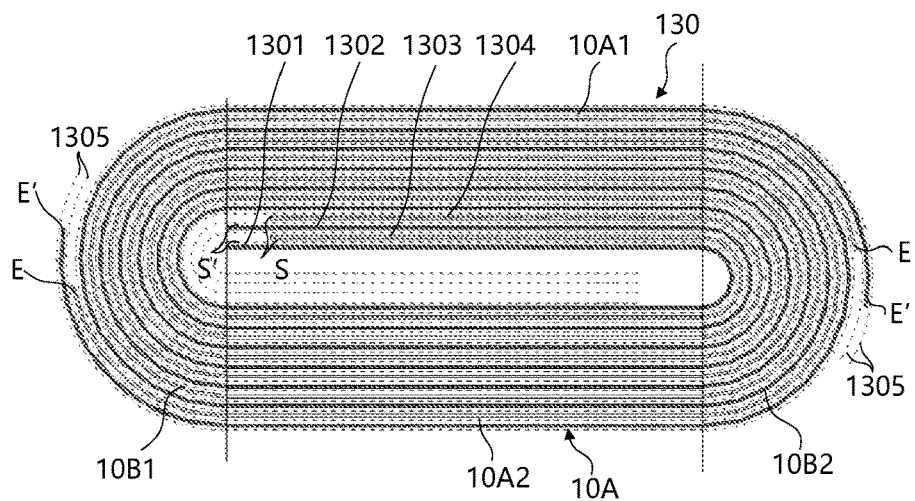

FIG. 15 is a structural schematic diagram showing that a flat electrode assembly is vertical to the cross section of the winding axis K in another embodiment of the present disclosure. The first type of electrode plate is a positive electrode plate, the second type of electrode plate is a negative electrode plate, the electrode assembly 130 includes a first negative electrode plate 1301, a second negative electrode plate 1302, a first positive electrode plate 1303, a second positive electrode plate 1304 and a plurality of diaphragms 1305, wherein the first negative electrode plate 1301, the first positive electrode plate 1303, the second negative electrode plate 1302 and the second positive electrode plate 1304 are superimposed alternately in sequence, and the first negative electrode plate 1301 is separated from the first positive electrode plate 1303 through a diaphragm 1305, the first positive electrode plate 1303 is separated from the second negative electrode plate 1302 through another diaphragm 1305, the second negative electrode plate 1302 is separated from the second positive electrode plate 1304 through another diaphragm 1305, and all the first negative electrode plates 1301, the second negative electrode plates 1302, the first positive electrode plates 1303, the second positive electrode plates 1304 and the plurality of diaphragms 1305 are superimposed and then wound around a winding axis K to form a flat winding structure.

As to the electrode assembly of the present embodiment, the first negative electrode plate 1301 and the second negative electrode plate 1302 can adopt different current collectors, and/or the first positive electrode plate 1303 and the second positive electrode plate 1304 can also adopt different current collectors. As to the structural form and material adopted by each current collector of each electrode plate, the thickness relationship of the current collectors of the electrode plates of the same polarity, the thickness of each layer when the electrode plate is of a multilayered structure, please refer to the current collectors described in the embodiments of the above FIG. 6 to FIG. 13, which will not be repeated redundantly herein.

The structure of the electrode assembly 130 of the present embodiment is basically similar to the structure of the electrode assembly described in the embodiment of FIG. 14, and the differences will be described below.

In the winding structure of the electrode assembly 130 of the present embodiment, the innermost ring of the winding structure is a ring enclosed by the first negative electrode plates 1301, and the outermost ring of the winding structure is a ring enclosed jointly by the first negative electrode plate 1301 and the second negative electrode plate 1302.

The first winding tail ends E of the first positive electrode plate 1303 and the second positive electrode plate 1304 are different, for example, the first winding tail ends E of the first positive electrode plate 1303 and the second positive electrode plate 1304 are respectively arranged at the second turning area 10B2 and the first turning area 10B1.

The second winding tail ends E' of the first negative electrode plate 1301 and the second negative electrode plate 1302 are different, for example, the second winding tail ends E' of the first negative electrode plate 1301 and the second negative electrode plate 1302 are respectively arranged at the first turning area 10B1 and the second turning area 10B2.

Along a winding direction, the second winding tail end E' of the first negative electrode plate 1301 exceeds the first winding tail end E of the second positive electrode plate 1304. The second winding tail end E' of the second negative electrode plate 1302 exceeds the first winding tail end E of the first positive electrode plate 1303.

The winding structure of the electrode assembly described above can reduce the step formed by the first positive electrode plate 1303 and the second positive electrode plate 1304 at the first winding tail end E, and reduce the step formed by the first negative electrode plate 1301 and the second negative electrode plate 1302 at the second winding tail end E', so as to reduce local stress exerted onto the electrode plate at the winding tail end after the electrode assembly is in contact with the housing when the electrode assembly expands, prevent cracking of the electrode plate or falling off of the active substance, and improve the reliability of long-term operation of the electrode assembly.

Figure 16:
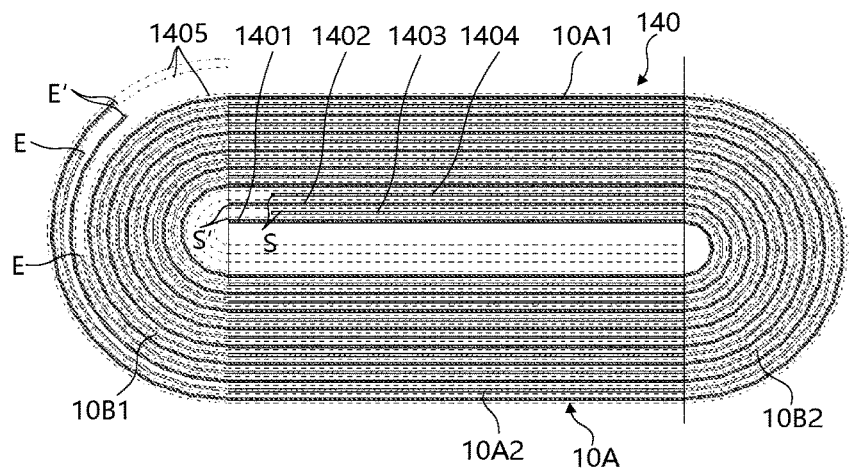

FIG. 16 is a structural schematic diagram showing that a flat electrode assembly is vertical to the cross section of the winding axis K in another embodiment of the present disclosure. The first type of electrode plate is a positive electrode plate, the second type of electrode plate is a negative electrode plate, the electrode assembly 140 includes a first negative electrode plate 1401, a second negative electrode plate 1402, a first positive electrode plate 1403, a second positive electrode plate 1404 and a plurality of diaphragms 1405, wherein the first negative electrode plate 1401, the first positive electrode plate 1403, the second negative electrode plate 1402 and the second positive electrode plate 1404 are superimposed alternately in sequence, and the first negative electrode plate 1401 is separated from the first positive electrode plate 1403 through a diaphragm 1405, the first positive electrode plate 1403 is separated from the second negative electrode plate 1402 through another diaphragm 1405, the second negative electrode plate 1402 is separated from the second positive electrode plate 1404 through another diaphragm 1405, and all the first negative electrode plates 1401, the second negative electrode plates 1402, the first positive electrode plates 1403, the second positive electrode plates 1404 and the plurality of diaphragms 1405 are superimposed and then wound around a winding axis K to form a flat winding structure.

As to the electrode assembly of the present embodiment, the first negative electrode plate 1401 and the second negative electrode plate 1402 can adopt different current collectors, and/or the first positive electrode plate 1403 and the second positive electrode plate 1404 can also adopt different current collectors. As to the structural form and material adopted by each current collector of each electrode plate, the thickness relationship of the current collectors of the electrode plates of the same polarity, the thickness of each layer when the electrode plate is of a multilayered structure, please refer to the current collectors described in the embodiments of the above FIG. 6 to FIG. 13, which will not be repeated redundantly herein.

The structure of the electrode assembly 140 of the present embodiment is basically similar to the structure of the electrode assembly described in the embodiment of FIG. 14, and the differences will be described below.

In the winding structure of the electrode assembly 140 of the present embodiment, the innermost ring of the winding structure is a ring enclosed by the first negative electrode plates 1401, and the outermost ring of the winding structure is a ring enclosed by the second negative electrode plates 1402.

In the winding structure of the electrode assembly of the present embodiment, the positions of the second winding tail ends E' of the first negative electrode plate 1401 and the second negative electrode plate 1402 are different, for example, the second winding tail ends E' of the first negative electrode plate 1401 and the second negative electrode plate 1402 are respectively arranged at the same turning area (for example, the first turning area 10B1), and the second winding tail ends E' of the first negative electrode plate 1401 and the second negative electrode plate 1402 are not flush.

The winding structure of the electrode assembly 140 described above can reduce the difference between the number of layers of electrode plates of the first sub-flattening area 10A1 and the second sub-flattening area 10A2. When the electrode assembly expands and is in contact with the housing, and when the inner wall of the housing exerts a counter-acting force to the two planes of the electrode assembly, the stress exerted onto the electrode plates of the first sub-flattening area 10A1 and the second sub-flattening area 10A2 is consistent.

Figure 17:
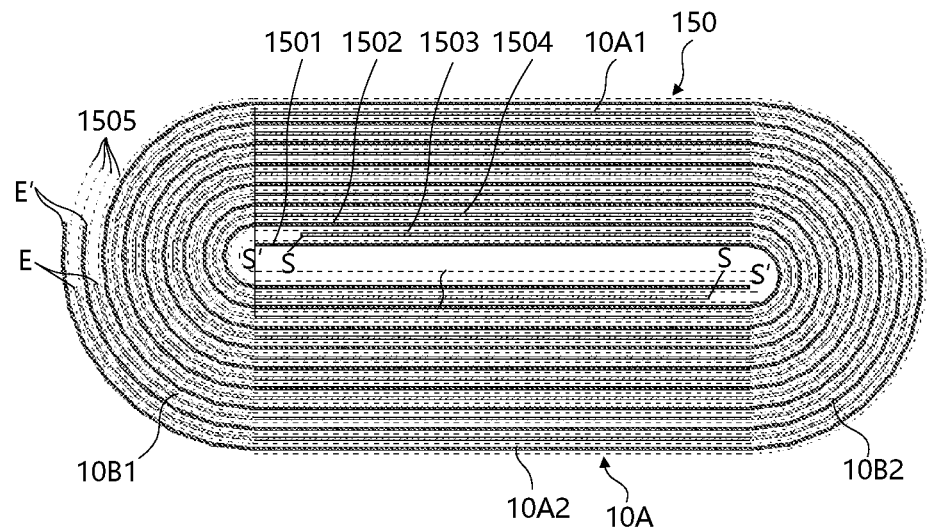

FIG. 17 is a structural schematic diagram showing that a flat electrode assembly is vertical to the cross section of the winding axis K in another embodiment of the present disclosure. The first type of electrode plate is a positive electrode plate, the second type of electrode plate is a negative electrode plate, the electrode assembly 150 includes a first negative electrode plate 1501, a second negative electrode plate 1502, a first positive electrode plate 1503, a second positive electrode plate 1504 and a plurality of diaphragms 1505, wherein the first negative electrode plate 1501, the first positive electrode plate 1503, the second negative electrode plate 1502 and the second positive electrode plate 1504 are superimposed alternately in sequence, and the first negative electrode plate 1501 is separated from the first positive electrode plate 1503 through a diaphragm 1505, the first positive electrode plate 1503 is separated from the second negative electrode plate 1502 through another diaphragm 1505, the second negative electrode plate 1502 is separated from the second positive electrode plate 1504 through another diaphragm 1505, and all the first negative electrode plates 1501, the second negative electrode plates 1502, the first positive electrode plates 1503, the second positive electrode plates 1504 and the plurality of diaphragms 1505 are superimposed and then wound around a winding axis K to form a flat winding structure.

As to the electrode assembly of the present embodiment, the first negative electrode plate 1501 and the second negative electrode plate 1502 can adopt different current collectors, and/or the first positive electrode plate 1503 and the second positive electrode plate 1504 can also adopt different current collectors. As to the structural form and material adopted by each current collector of each electrode plate, the thickness relationship of the current collectors of the electrode plates of the same polarity, the thickness of each layer when the electrode plate is of a multilayered structure, please refer to the current collectors described in the embodiments of the above FIG. 6 to FIG. 13, which will not be repeated redundantly herein.

The structure of the electrode assembly 150 of the present embodiment is basically similar to the structure of the electrode assembly described in the embodiment of FIG. 14, and the differences will be described below. In the winding structure of the electrode assembly of the present embodiment, the innermost ring of the winding structure is a ring enclosed jointly by the first negative electrode plates 1501 and the second negative electrode plate 1502, and the outermost ring of the winding structure is a ring enclosed by the second negative electrode plate 1502.

In the winding structure of the electrode assembly 150 of the present embodiment, the positions of the first winding initial ends S of the first positive electrode plate 1503 and the second positive electrode plate 1504 are different, for example, the first winding initial ends S of the first positive electrode plate 1503 and the second positive electrode plate 1504 are respectively arranged at the first sub-flattening area 10A1 and the second sub-flattening area 10A2, and the first winding initial ends S of the first positive electrode plate 1503 and the second positive electrode plate 1504 are not flush.

The positions of the second winding initial ends S of the first negative electrode plate 1501 and the second negative electrode plate 1502 are different, for example, the second winding initial ends S of the first negative electrode plate 1501 and the second negative electrode plate 1502 are respectively arranged at the first sub-flattening area 10A1 and the second sub-flattening area 10A2, and the second winding initial ends S of the first positive electrode plate 1501 and the second negative electrode plate 1502 are not flush.

The winding structure of the electrode assembly described above can reduce the step formed by the first positive electrode plate 1503 and the second positive electrode plate 1504 at the first winding initial end S, and reduce the step formed by the first negative electrode plate 1501 and the second negative electrode plate 1502 at the second winding initial end S', so as to reduce local stress exerted onto the electrode plate at the winding initial end after the electrode assembly expands and is in contact with the housing 20, prevent cracking of the electrode plate or falling off of the active substance, and improve the reliability of long-term operation of the electrode assembly.

Figure 18:
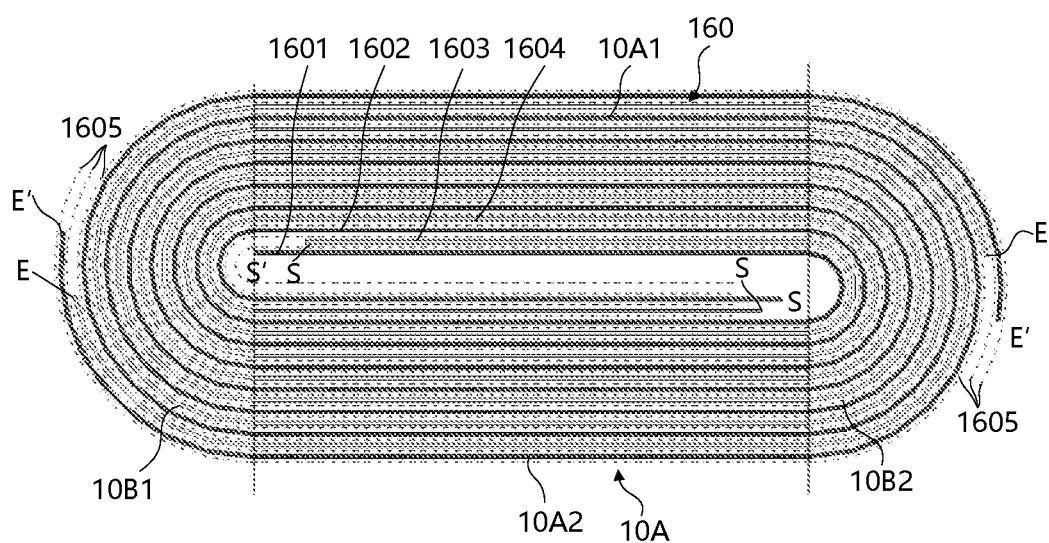

FIG. 18 is a structural schematic diagram showing that a flat electrode assembly is vertical to the cross section of the winding axis K in another embodiment of the present disclosure. The first type of electrode plate is a positive electrode plate, the second type of electrode plate is a negative electrode plate, the electrode assembly 160 includes a first negative electrode plate 1601, a second negative electrode plate 1602, a first positive electrode plate 1603, a second positive electrode plate 1604 and a plurality of diaphragms 1605, wherein the first negative electrode plate 1601, the first positive electrode plate 1603, the second negative electrode plate 1602 and the second positive electrode plate 1604 are superimposed alternately in sequence, and the first negative electrode plate 1601 is separated from the first positive electrode plate 1603 through a diaphragm 1605, the first positive electrode plate 1603 is separated from the second negative electrode plate 1602 through another diaphragm 1605, the second negative electrode plate 1602 is separated from the second positive electrode plate 1604 through another diaphragm 1605, and all the first negative electrode plates 1601, the second negative electrode plates 1602, the first positive electrode plates 1603, the second positive electrode plates 1604 and the plurality of diaphragms 1605 are superimposed and then wound around a winding axis K to form a flat winding structure.

As to the electrode assembly of the present embodiment, the first negative electrode plate 1601 and the second negative electrode plate 1602 can adopt different current collectors, and/or the first positive electrode plate 1603 and the second positive electrode plate 1604 can also adopt different current collectors. As to the structural form and material adopted by each current collector of each electrode plate, the thickness relationship of the current collectors of the electrode plates of the same polarity, the thickness of each layer when the electrode plate is of a multilayered structure, please refer to the current collectors described in the embodiments of the above FIG. 6 to FIG. 13, which will not be repeated redundantly herein.

The structure of the electrode assembly 160 of the present embodiment is basically similar to the structure of the electrode assembly described in the embodiment of FIG. 14, and the differences will be described below. In the winding structure of the electrode assembly of the present embodiment, the innermost ring of the winding structure is a ring enclosed jointly by the first negative electrode plates 1601 and the second negative electrode plates 1602, and the outermost ring of the winding structure is a ring enclosed jointly by the first negative electrode plates 1601 and the second negative electrode plates 1602.

In the winding structure of the electrode assembly 160 of the present embodiment, the positions of the first winding initial ends S of the first positive electrode plate 1603 and the second positive electrode plate 1604 are different, for example, the first winding initial ends S of the first positive electrode plate 1603 and the second positive electrode plate 1604 are respectively arranged at the first sub-flattening area 10A1 and the second sub-flattening area 10A2, and the first winding initial ends S of the first positive electrode plate 1603 and the second positive electrode plate 1604 are not flush.

The positions of the second winding initial ends S' of the first negative electrode plate 1601 and the second negative electrode plate 1602 are also different, for example, the second winding initial ends S' of the first negative electrode plate 1601 and the second negative electrode plate 1602 are respectively arranged at the first sub-flattening area 10A1 and the second sub-flattening area 10A2, and the second winding initial ends S' of the first negative electrode plate 1601 and the second negative electrode plate 1602 are not flush.

The positions of the first winding tail ends E of the first positive electrode plate 1603 and the second positive electrode plate 1604 are different, for example, the first winding tail ends E of the first positive electrode plate 1603 and the second positive electrode plate 1604 are both arranged at different turning areas 10B, and the first winding tail ends E of the first positive electrode plate 1303 and the second positive electrode plate 1304 are not flush.

The positions of the second winding tail ends E' of the first negative electrode plate 1601 and the second negative electrode plate 1602 are also different, for example, the second winding tail ends E' of the first negative electrode plate 1601 and the second negative electrode plate 1602 are respectively arranged at two different turning areas 10B, and the second winding tail ends E' of the first negative electrode plate 1601 and the second negative electrode plate 1602 are not flush.

The winding structure of the electrode assembly described above can simultaneously reduce the steps formed by the first positive electrode plate 1603 and the second positive electrode plate 1604 at the first winding initial end S and the first winding tail end E, and reduce the steps formed by the first negative electrode plate 1601 and the second negative electrode plate 1602 at the second winding initial end S' and the second winding tail end E', so as to reduce local stress exerted onto the electrode plate at the winding initial end and the winding tail end after the electrode assembly expands and is in contact with the housing 20, prevent cracking of the electrode plate or falling off of the active substance, and improve the reliability of long-term operation of the electrode assembly.

On the basis of the above embodiments, on different radial directions of the winding structure, that is, at different circumferential positions of the winding structure, the difference of number of layers of electrode plates does not exceed a preset number of layers, the number of layers of electrode plates herein refers to the total number of layers of the positive electrode plates and negative electrode plates. Wherein the preset number of layers is smaller than or equal to the sum of the quantity of the plurality of positive electrode plates and the quantity of the plurality of negative electrode plates.

When the electrode assembly expands and is in contact with the housing 20, the housing 20 will exert a counteracting force onto the electrode assembly, such that the stress on each point of the circumferential direction of the electrode assembly is more uniform, thereby preventing the electrode assembly from having great difference in performances at various points in the using process. For example, two positive electrode plates are arranged, two negative electrode plates are arranged, the preset number of layers is smaller than or equal to four, and the smaller the difference of the number of layers of electrode plates is, the more uniform the stress exerted onto the electrode assembly at each point of the circumferential direction is.

As shown in FIG. 14 to FIG. 18, the outermost layer and the innermost layer of the winding structure are both negative electrode plates. The material of the positive active substance in the positive electrode plate is generally ternary material, lithium manganese oxide or lithium iron phosphate, and the material of the negative active substance in the negative electrode plate is generally graphite or silicon, since the material of the positive active substance is more expensive than the material of the negative active substance, therefore, the outermost layer and the innermost layer of the winding structure are coated by the negative electrode plates, and the positive active substance of the positive electrode plate can be sufficiently utilized, thereby not only improving energy utilization ratio of the winding structure, but also lowering difficulty in manufacturing process of the electrode assembly.

Optionally, a positive electrode plate is adopted in at least one of the outermost layer and the innermost layer of the winding structure, to reduce the manufacturing cost of the electrode assembly, for the positive electrode plate arranged at the outermost layer or the innermost layer, the positive active substance does not need to be coated on the surface, far away from the negative electrode plate, of the positive electrode plate.

FIG. 19 to FIG. 22 are structural schematic diagrams of a cylindrical electrode assembly.

Figure 19:
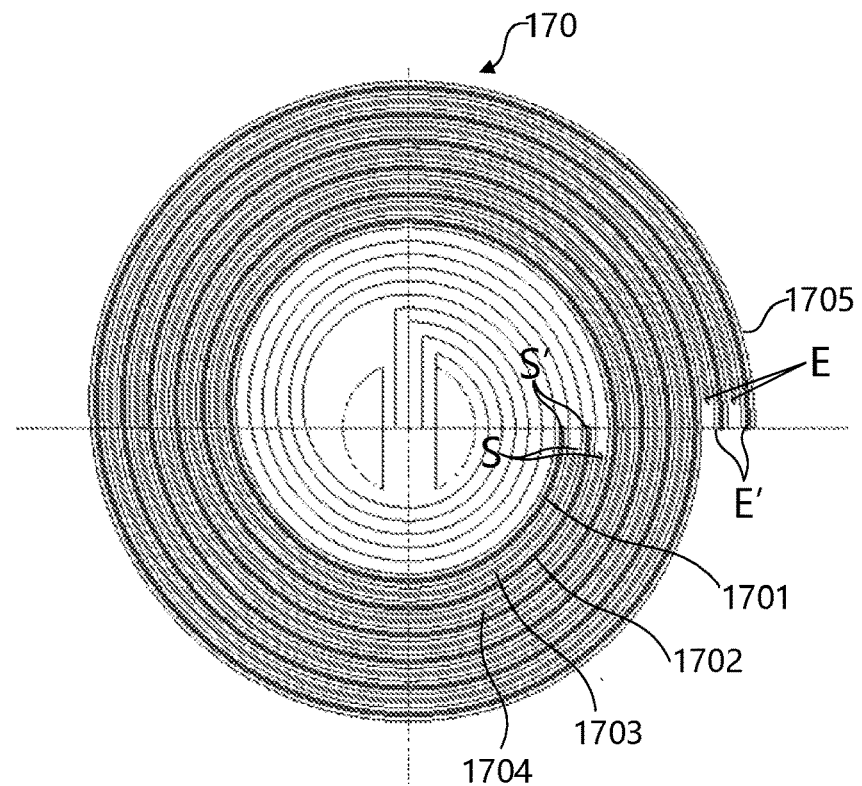
FIG. 19, FIG. 20, FIG. 21 and FIG. 22 are respectively sectional views of a first embodiment, a second embodiment, a third embodiment and a fourth embodiment of a cylindrical electrode assembly of the present disclosure in a plane vertical to a winding axis.

FIG. 19 is a structural schematic diagram showing that a cylindrical electrode assembly is vertical to the cross section of the winding axis K in another embodiment of the present disclosure. The first type of electrode plate is a positive electrode plate, the second type of electrode plate is a negative electrode plate, the electrode assembly 170 includes a first negative electrode plate 1701, a second negative electrode plate 1702, a first positive electrode plate 1703, a second positive electrode plate 1704 and a plurality of diaphragms 1705, wherein the first negative electrode plate 1701, the first positive electrode plate 1703, the second negative electrode plate 1702 and the second positive electrode plate 1704 are superimposed alternately in sequence, and the first negative electrode plate 1701 is separated from the first positive electrode plate 1703 through a diaphragm 1705, the first positive electrode plate 1703 is separated from the second negative electrode plate 1702 through another diaphragm 1705, the second negative electrode plate 1702 is separated from the second positive electrode plate 1704 through another diaphragm 1705, and all the first negative electrode plates 1701, the second negative electrode plates 1702, the first positive electrode plates 1703, the second positive electrode plates 1704 and the plurality of diaphragms 1705 are superimposed and then wound around a winding axis K to form a cylindrical winding structure.

In the electrode assembly 170 in the present embodiment, as to the structures and positions of the positive tab parts of the first positive electrode plate 1703 and the second positive electrode plate 1704 and the negative tab parts of the first negative electrode plate 1701 and the second negative electrode plate 1702, please refer to the related contents of the positive tab parts and the negative tab parts described in the embodiments of the above FIG. 6 to FIG. 13, which will not be repeated redundantly herein.

In the present embodiment, as to the following specific conditions: on different radial directions of the winding structure, that is, at different positions of the circumferential direction of the winding structure, the difference between the number of layers of electrode plates is no greater than the number of preset layers, please also refer to the related contents described in the embodiments of the above FIG. 6 to FIG. 13, which will not be repeated redundantly herein.

As to the electrode assembly 170 of the present embodiment, the negative active substance area respectively included in the first negative electrode plate 1701 and the second negative electrode plate 1702 can be the same as the negative active substance area included in the negative electrode plate described in the above embodiments of FIG. 6 to FIG. 13, and the positive active substance area respectively included in the first positive electrode plate 1703 and the second positive electrode plate 1704 can be the same as the negative active substance area included in the negative electrode plate described in the above embodiments of FIG. 6 to FIG. 13, which will not be repeated redundantly herein.

As to the electrode assembly of the present embodiment, the first negative electrode plate 1701 and the second negative electrode plate 1702 can adopt different current collectors, and/or the first positive electrode plate 1703 and the second positive electrode plate 1704 can also adopt different current collectors. As to the structural form and material adopted by each current collector of each electrode plate, the thickness relationship of the current collectors of the electrode plates of the same polarity, the thickness of each layer when the electrode plate is of a multilayered structure, please refer to the current collectors described in the embodiments of the above FIG. 6 to FIG. 13, which will not be repeated redundantly herein.

In the winding structure, the innermost ring of the winding structure is a ring enclosed by the first negative electrode plate 1701, and the outermost ring of the winding structure is the ring enclosed by the second negative electrode plate 1702.

The positions of the first winding initial ends S of the first positive electrode plate 1703 and the second positive electrode plate 1704 are the same, for example, the first winding initial ends S of the first positive electrode plate 1703 and the second positive electrode plate 1704 are both arranged at the same radial direction of the winding structure, and the first winding initial ends S of the first positive electrode plate 1703 and the second positive electrode plate 1704 are flush.

The positions of the second winding initial ends S' of the first negative electrode plate 1701 and the second negative electrode plate 1702 are also the same, for example, the second winding initial ends S' of the first negative electrode plate 1701 and the second negative electrode plate 1702 are both arranged at the same radial direction of the winding structure, and the second winding initial ends S' of the first negative electrode plate 1701 and the second negative electrode plate 1702 are flush.

Along a reverse direction of the winding direction, the second winding initial end S' of the first negative electrode plate 1701 exceeds the first winding initial end S of the first positive electrode plate 1704. The second winding initial end S' of the second negative electrode plate 1702 exceeds the first winding initial end S of the second positive electrode plate 1703.

The positions of the first winding tail ends E of the first positive electrode plate 1703 and the second positive electrode plate 1704 are the same, for example, the first winding tail ends E of the first positive electrode plate 1703 and the second positive electrode plate 1704 are both arranged at the turning area 10B on the same side, and the first winding tail ends E of the first positive electrode plate 1703 and the second positive electrode plate 1704 are flush.

The positions of the second winding tail ends E' of the first negative electrode plate 1701 and the second negative electrode plate 1702 are also the same, for example, the second winding tail ends E' of the first negative electrode plate 1701 and the second negative electrode plate 1702 are both arranged in the same turning area 10B, and the second winding tail ends E' of the first negative electrode plate 1701 and the second negative electrode plate 1702 are flush.

Along a winding direction, the second winding tail end E' of the first negative electrode plate 1701 exceeds the first winding tail end E of the second positive electrode plate 1704. The second winding tail end E' of the second negative electrode plate 1702 exceeds the first winding tail end E of the first positive electrode plate 1703.

The winding structure described above can enable the length differences of the plurality of electrode plates before winding to be approximate, thereby being easy to wind.

Figure 20:
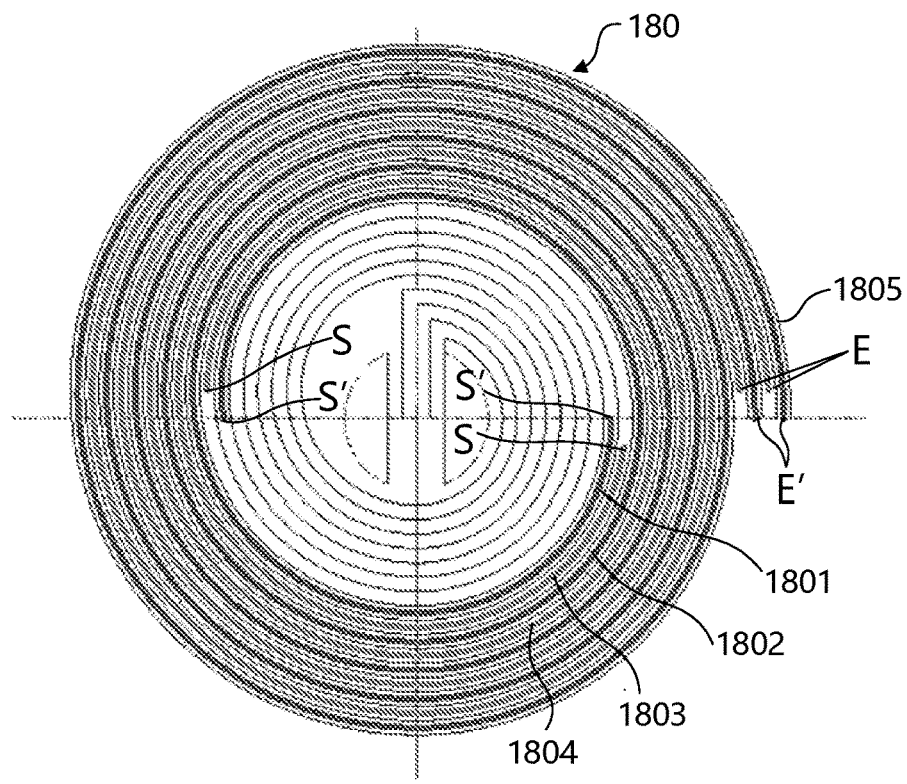

FIG. 20 is a structural schematic diagram showing that a cylindrical electrode assembly is vertical to the cross section of the winding axis K in another embodiment of the present disclosure. The first type of electrode plate is a positive electrode plate, the second type of electrode plate is a negative electrode plate, the electrode assembly 180 includes a first negative electrode plate 1801, a second negative electrode plate 1802, a first positive electrode plate 1803, a second positive electrode plate 1804 and a plurality of diaphragms 1805, wherein the first negative electrode plate 1801, the first positive electrode plate 1803, the second negative electrode plate 1802 and the second positive electrode plate 1804 are superimposed alternately in sequence, and the first negative electrode plate 1801 is separated from the first positive electrode plate 1803 through a diaphragm 1805, the first positive electrode plate 1803 is separated from the second negative electrode plate 1802 through another diaphragm 1805, the second negative electrode plate 1802 is separated from the second positive electrode plate 1804 through another diaphragm 1805, and all the first negative electrode plates 1801, the second negative electrode plates 1802, the first positive electrode plates 1803, the second positive electrode plates 1804 and the plurality of diaphragms 1805 are superimposed and then wound around a winding axis K to form a cylindrical winding structure.

As to the electrode assembly of the present embodiment, the first negative electrode plate 1801 and the second negative electrode plate 1802 can adopt different current collectors, and/or the first positive electrode plate 1803 and the second positive electrode plate 1804 can also adopt different current collectors. As to the structural form and material adopted by each current collector of each electrode plate, the thickness relationship of the current collectors of the electrode plates of the same polarity, the thickness of each layer when the electrode plate is of a multilayered structure, please refer to the current collectors described in the embodiments of the above FIG. 6 to FIG. 13, which will not be repeated redundantly herein.

The structure of the present embodiment is basically similar to the structure described in the embodiment of FIG. 19, and the differences will be described below. In the winding structure of the present embodiment, the innermost ring of the winding structure is a ring enclosed jointly by the first negative electrode plates 1801 and the second negative electrode plate 1802, and the outermost ring of the winding structure is a ring enclosed by the first negative electrode plate 1801.

In the winding structure of the present embodiment, the positions of the first winding initial ends S of the first positive electrode plate 1803 and the second positive electrode plate 1804 are different, for example, the first winding initial ends S of the first positive electrode plate 1803 and the second positive electrode plate 1804 are respectively arranged at a relative radial direction of the winding structure, and the first winding initial ends S of the first positive electrode plate 1803 and the second positive electrode plate 1804 are not flush.

The positions of the second winding initial ends S of the first negative electrode plate 1801 and the second negative electrode plate 1802 are also different, for example, the second winding initial end S' of the first negative electrode plate 1801 and the second winding initial end S' of the second negative electrode plate 1802 are arranged at a relative radial direction of the winding structure, and the second winding initial ends S' of the first negative electrode plate 1801 and the second negative electrode plate 1802 are not flush.

The winding structure described above can reduce the step formed by the first positive electrode plate 1803 and the second positive electrode plate 1804 at the first winding initial end S, and reduce the step formed by the first negative electrode plate 1801 and the second negative electrode plate 1802 at the second winding initial end S', so as to reduce local stress exerted onto the electrode plate at the winding initial end after the electrode assembly expands and is in contact with the housing 20, prevent cracking of the electrode plate or falling off of the active substance, and improve the reliability of long-term operation of the electrode assembly.

Figure 21:
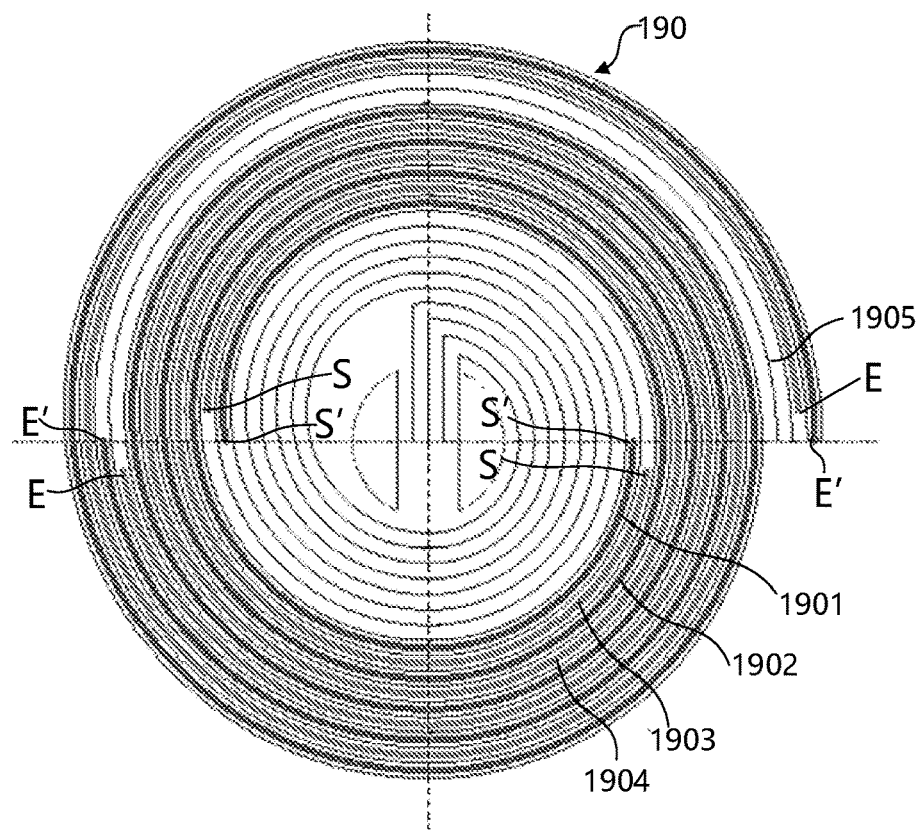

FIG. 21 is a structural schematic diagram showing that a cylindrical electrode assembly is vertical to the cross section of the winding axis K in another embodiment of the present disclosure. The first type of electrode plate is a positive electrode plate, the second type of electrode plate is a negative electrode plate, the electrode assembly 190 includes a first negative electrode plate 1901, a second negative electrode plate 1902, a first positive electrode plate 1903, a second positive electrode plate 1904 and a plurality of diaphragms 1905, wherein the first negative electrode plate 1901, the first positive electrode plate 1903, the second negative electrode plate 1902 and the second positive electrode plate 1904 are superimposed alternately in sequence, and the first negative electrode plate 1901 is separated from the first positive electrode plate 1903 through a diaphragm 1905, the first positive electrode plate 1903 is separated from the second negative electrode plate 1902 through another diaphragm 1905, the second negative electrode plate 1902 is separated from the second positive electrode plate 1904 through another diaphragm 1905, and all the first negative electrode plates 1901, the second negative electrode plates 1902, the first positive electrode plates 1903, the second positive electrode plates 1904 and the plurality of diaphragms 1905 are superimposed and then wound around a winding axis K to form a flat winding structure.

As to the electrode assembly of the present embodiment, the first negative electrode plate 1901 and the second negative electrode plate 1902 can adopt different current collectors, and/or the first positive electrode plate 1903 and the second positive electrode plate 1904 can also adopt different current collectors. As to the structural form and material adopted by each current collector of each electrode plate, the thickness relationship of the current collectors of the electrode plates of the same polarity, the thickness of each layer when the electrode plate is of a multilayered structure, please refer to the current collectors described in the embodiments of the above FIG. 6 to FIG. 13, which will not be repeated redundantly herein.

The structure of the present embodiment is basically similar to the structure described in the embodiment of FIG. 20, and the differences will be described below. In the winding structure of the present embodiment, the innermost ring of the winding structure is a ring enclosed jointly by the first negative electrode plates 1901 and the second negative electrode plate 1902, and the outermost ring of the winding structure is a ring enclosed by the first negative electrode plates 1901.

In the winding structure of the present embodiment, the positions of the first winding tail ends E of the first positive electrode plate 1903 and the second positive electrode plate 1904 are different, and the second winding tail ends E' of the first negative electrode plates 1901 and the second negative electrode plate 1902 are also different.

Along a winding direction, the first negative electrode plate 1901 is arranged at the outermost layer and the end position of the second winding tail end E' exceeds the end position of the second winding tail end E' of the second negative electrode plate 1902, and the end position of the second winding tail end E' of the first positive electrode plate 1903 exceeds the end position of the second winding tail end E' of the second positive electrode plate 1904, for example, exceeding by half a ring, and the exceeded part presses inwards along a radial direction until the exceeded part is in contact with the electrode plates in the inner layer, to improve the stability of the winding structure.

The winding structure described above can simultaneously reduce the steps formed by the first positive electrode plate 1903 and the second positive electrode plate 1904 at the first winding initial end S and the first winding tail end E, and reduce the steps formed by the first negative electrode plate 1901 and the second negative electrode plate 1902 at the second winding initial end S' and the second winding tail end E', so as to reduce local stress exerted onto the electrode plate at the winding initial end and the winding tail end after the electrode assembly expands and is in contact with the housing 20, prevent cracking of the electrode plate or falling off of the active substance, and improve the reliability of long-term operation of the electrode assembly.

Moreover, the number of layers of the winding structure in different radial directions can be the same, for the cylindrical winding structure, when the electrode assembly expands and is in contact with the housing 20, the stress along each point of the circumferential direction is consistent.

Figure 22:
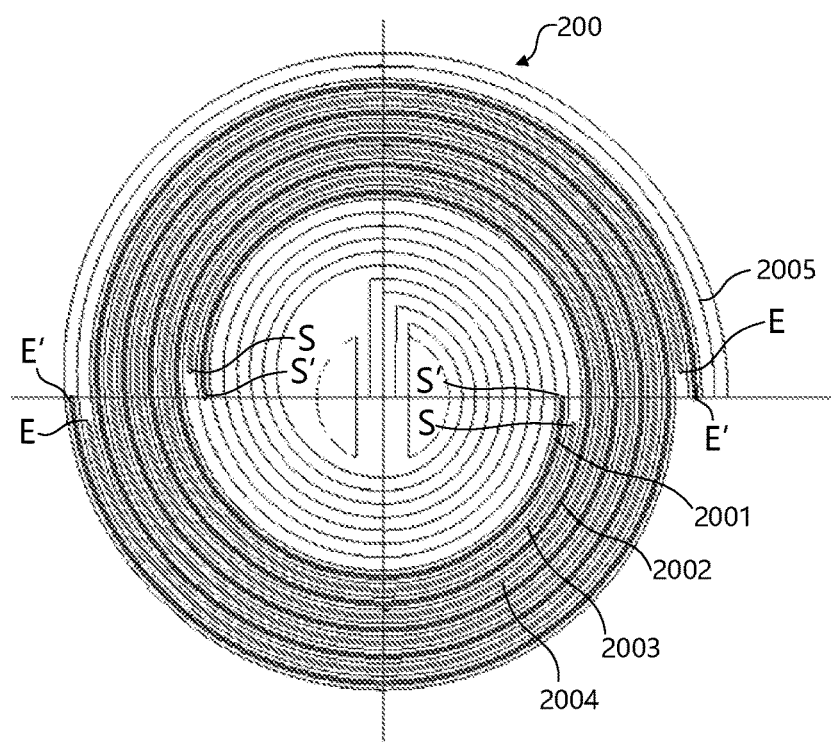

FIG. 22 is a structural schematic diagram showing that a cylindrical electrode assembly is vertical to the cross section of the winding axis K in another embodiment of the present disclosure. The first type of electrode plate is a positive electrode plate, the second type of electrode plate is a negative electrode plate, the electrode assembly 200 includes a first negative electrode plate 2001, a second negative electrode plate 2002, a first positive electrode plate 2003, a second positive electrode plate 2004 and a plurality of diaphragms 2005, wherein the first negative electrode plate 2001, the first positive electrode plate 2003, the second negative electrode plate 2002 and the second positive electrode plate 2004 are superimposed alternately in sequence, and the first negative electrode plate 2001 is separated from the first positive electrode plate 2003 through a diaphragm 2005, the first positive electrode plate 2003 is separated from the second negative electrode plate 2002 through another diaphragm 2005, the second negative electrode plate 2002 is separated from the second positive electrode plate 2004 through another diaphragm 2005, and all the first negative electrode plates 2001, the second negative electrode plates 2002, the first positive electrode plates 2003, the second positive electrode plates 2004 and the plurality of diaphragms 2005 are superimposed and then wound around a winding axis K to form a flat winding structure.

As to the electrode assembly of the present embodiment, the first negative electrode plate 2001 and the second negative electrode plate 2002 can adopt different current collectors, and/or the first positive electrode plate 2003 and the second positive electrode plate 2004 can also adopt different current collectors. As to the structural form and material adopted by each current collector of each electrode plate, the thickness relationship of the current collectors of the electrode plates of the same polarity, the thickness of each layer when the electrode plate is of a multilayered structure, please refer to the current collectors described in the embodiments of the above FIG. 6 to FIG. 13, which will not be repeated redundantly herein.

The structure of the present embodiment is basically similar to the structure described in the embodiment of FIG. 20, and the differences will be described below. In the winding structure of the present embodiment, the innermost ring of the winding structure is a ring enclosed jointly by the first negative electrode plates 2001 and the second negative electrode plate 2002, and the outermost ring of the winding structure is a ring enclosed jointly by the first negative electrode plates 2001 and the second negative electrode plate 2002.

Along a winding direction, the second negative electrode plate 2002 is arranged at the outermost layer and the end position of the second winding tail end E' exceeds the end position of the second winding tail end E' of the first negative electrode plate 2001, and the end position of the second winding tail end E' of the second positive electrode plate 2004 exceeds the end position of the second winding tail end E' of the first positive electrode plate 2003, for example, exceeding by half a ring.

The winding structure described above can simultaneously reduce the steps formed by the first positive electrode plate 2003 and the second positive electrode plate 2004 at the first winding initial end S and the first winding tail end E, and reduce the steps formed by the first negative electrode plate 2001 and the second negative electrode plate 2002 at the second winding initial end S' and the second winding tail end E', so as to reduce local stress exerted onto the electrode plate at the winding initial end and the winding tail end after the electrode assembly expands and is in contact with the housing 20, prevent cracking of the electrode plate or falling off of the active substance, and improve the reliability of long-term operation of the electrode assembly.

Moreover, the number of layers of the winding structure in different radial directions can be the same, for the cylindrical winding structure, when the electrode assembly expands and is in contact with the housing 20, the stress along each point of the circumferential direction is consistent.

In addition, this structure can avoid bending of the outermost layer of electrode plates and the penultimate layer of electrode plates at the winding tail end of other electrode plates, such that all the layers of electrode plates are in reliable contact, and no local stress is easily produced on the electrode plate, thereby preventing cracking of the electrode plate or falling off of the active substance.

Figure 23:
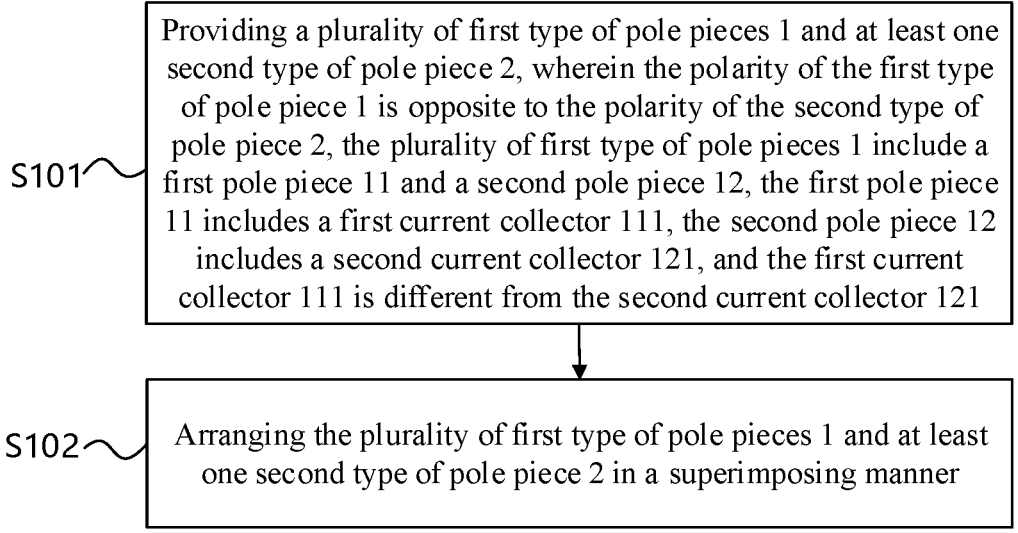
FIG. 23 is a flow diagram of some embodiments of a manufacturing method of an electrode assembly of the present disclosure.

Secondly, the present disclosure further provides a manufacturing method of an electrode assembly, in another embodiment of the present disclosure, the flow diagram as shown in FIG. 23 includes:

step 101, providing a plurality of first type of electrode plates 1 and at least one second type of electrode plate 2, wherein the polarity of the first type of electrode plate 1 is opposite to the polarity of the second type of electrode plate 2, the plurality of first type of electrode plates 1 include a first electrode plate 11 and a second electrode plate 12, the first electrode plate 11 includes a first current collector 111, the second electrode plate 12 includes a second current collector 121, and the first current collector 111 is different from the second current collector 121; and step 102, arranging the plurality of first type of electrode plates 1 and at least one second type of electrode plate 2 in a superimposing manner.

Wherein, step 102 is performed after step 101. In step 101, specifically, the plurality of first type of electrode plates 1, the plurality of diaphragms 3 and the plurality of second type of electrode plates 2 are superimposed in the thickness direction of the electrode plate, the plurality of first type of electrode plates 1 and each of the plurality of second type of electrode plates 2 are arranged alternately one by one, and a diaphragm 3 is arranged between any adjacent first type of electrode plate 1 and the second type of electrode plate 2.

In the present embodiment, according to many aspects of demands of the electrode assembly 10, the electrode plates of the same polarity can be designed to include different current collectors, to improve flexibility of structure configuration of the electrode assembly 10, and advantages of different current collectors can be integrated into the same electrode assembly 10, to balance the performance of various aspects of the electrode assembly 10, and further improve the comprehensive performance of the battery 400.

Figure 24:
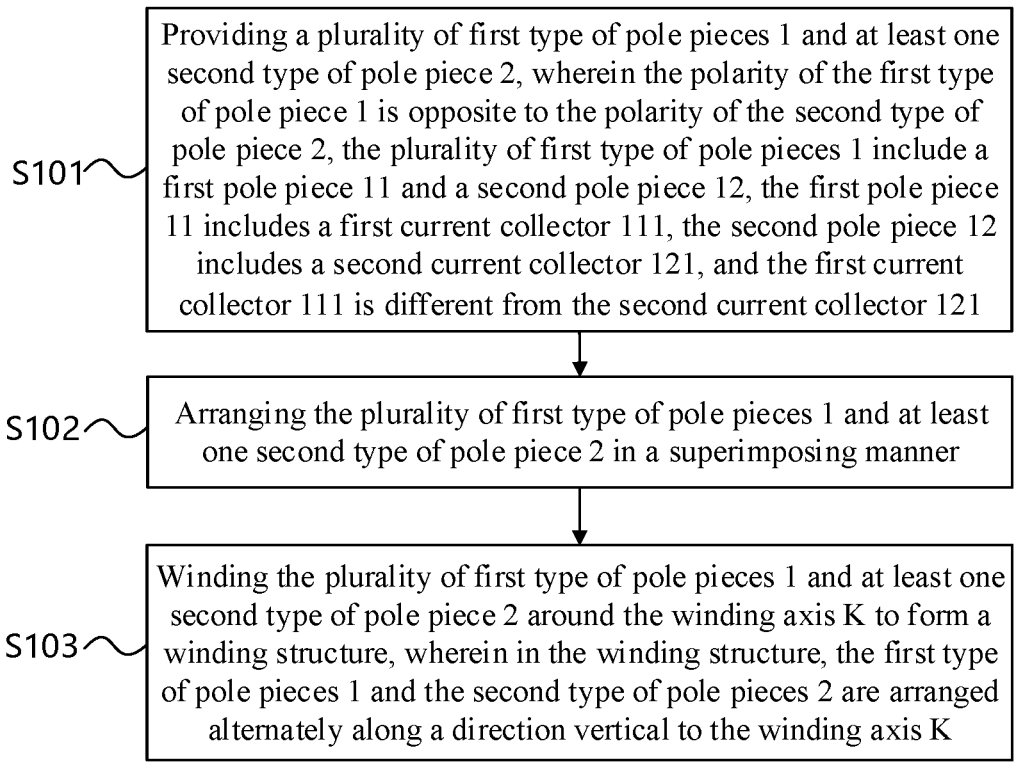
FIG. 24 is a flow diagram of some other embodiments of a manufacturing method of an electrode assembly of the present disclosure.

In another embodiment of the present disclosure, the electrode assembly 10 is a winding electrode assembly, after step 102, as shown in the flow diagram shown in FIG. 24, the manufacturing method of the electrode assembly 10 further includes:

step 103, winding the plurality of first type of electrode plates 1 and at least one second type of electrode plate 2 around the winding axis K to form a winding structure, wherein in the winding structure, the first type of electrode plates 1 and the second type of electrode plates 2 are arranged alternately along a direction vertical to the winding axis K.

Figure 25:
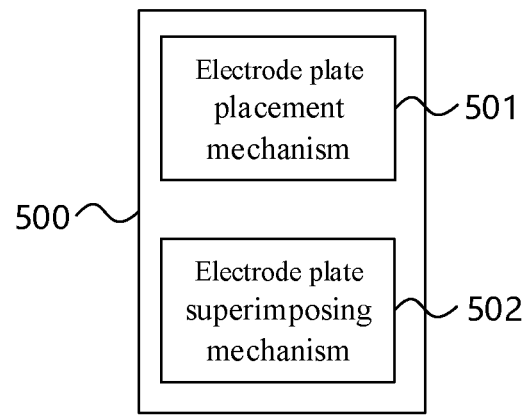
FIG. 25 is a structural schematic diagram of some embodiments of a manufacturing device of an electrode assembly of the present disclosure.

Finally, the present disclosure further provides a manufacturing device 500 of an electrode assembly. In another embodiment of the present disclosure, as shown in FIG. 25, the manufacturing device 500 includes: an electrode plate placement mechanism 501 and an electrode plate superimposing mechanism 502.

The electrode plate placement mechanism 501 is configured to provide a plurality of first type of electrode plates 1 and at least one second type of electrode plate 2, wherein the polarity of the first type of electrode plate 1 is opposite to the polarity of the second type of electrode plate 2, the plurality of first type of electrode plates 1 include a first electrode plate 11 and a second electrode plate 12, the first electrode plate 11 includes a first current collector 111, the second electrode plate 12 includes a second current collector 121, and the first current collector 111 is different from the second current collector 121; and the electrode plate superimposing mechanism 502 is configured to arrange the plurality of first type of electrode plates 1 and at least one second type of electrode plate 2 in a superimposing manner.

Through the electrode assembly 10 produced by the manufacturing device 500 of the electrode assembly, according to a plurality of aspects of demands of the battery, the electrode plates of the same polarity can be designed to include different current collectors, to improve flexibility of structure configuration of the electrode assembly 10, and advantages of different current collectors can be integrated into the same electrode assembly, to balance the performance of various aspects of the electrode assembly 10, and further improve the comprehensive performance of the battery 400.

Figure 26:
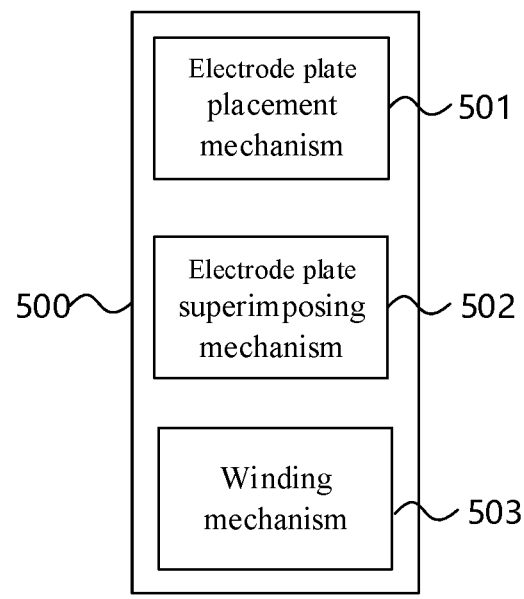
FIG. 26 is a structural schematic diagram of some other embodiments of a manufacturing device of an electrode assembly of the present disclosure.

In another embodiment of the present disclosure, as shown in FIG. 26, the electrode assembly 10 is a winding electrode assembly, the manufacturing device 500 of the electrode assembly can further include a winding mechanism 503 configured to wind a plurality of first type of electrode plates 1 and a plurality of second type of electrode plates 2 around the winding axis K to form a winding structure, wherein in the winding structure, the first type of electrode plates 1 and the second type of electrode plate 2 are arranged alternately along the direction vertical to the winding axis K. The winding mechanism 503 can provide a stable winding tensile force for the electrode plate.

Finally, it should be noted that, the above embodiments are merely for illustrating the technical solutions of the present disclosure, rather than for limiting the present disclosure. Although the present disclosure is described in detail with reference to the above embodiments, those skilled in the art should understand that, technical solutions recorded in each above embodiment can still be modified or part of the technical features can be equivalently substituted; while all the modifications or substitutions do not enable the essence of the corresponding technical solutions to depart from the spirit and scope of the technical solutions of each embodiment of the present disclosure.

What is claimed is:

1. An electrode assembly, comprising:
a plurality of first type of electrode plates, at least one second type of electrode plate, and a diaphragm, which are arranged in an overlapping manner,
wherein the polarity of the plurality of first type of electrode plates is opposite to the polarity of the at least one second type of electrode plate, the diaphragm is configured to separate an adjacent first type of electrode plate from the at least one second type of electrode plate, and the plurality of first type of electrode plates comprises a first electrode plate and a second electrode plate,
wherein the first electrode plate comprises a first current collector, and the second electrode plate comprises a second current collector,
wherein the first current collector comprises a first conducting layer and a protective layer which are arranged in an overlapping manner along a direction vertical to a surface on which the plurality of first type of electrode plates and the at least one second type of electrode plate are overlapped, and the resistivity of the protective layer is greater than the resistivity of the first conducting layer, and the first current collector comprises two of the protective layers, respectively arranged at two sides of the first conducting layer, and
wherein the second current collector is composed of a second conducting layer.

2. The electrode assembly according to claim 1, wherein the material of each of the two protective layers comprises at least one of the following: polymer matrix, conducting material, and inorganic filler.

3. The electrode assembly according to claim 2, wherein the polymer matrix comprises at least one of the following: polyvinylidene fluoride polymer matrix and polyvinylidene chloride polymer matrix.

4. The electrode assembly according to claim 1, wherein the material of the first conducting layer is the same as the material of the second conducting layer.

5. The electrode assembly according to claim 1, wherein the materials of the first conducting layer and the second conducting layer are both metal.

6. The electrode assembly according to claim 1, wherein the thickness of the first conducting layer is smaller than or equal to the thickness of the second conducting layer.

7. The electrode assembly according to claim 1, wherein the difference between the thickness of the first current collector and the thickness of the second current collector is no greater than 5 μm.

8. The electrode assembly according to claim 1, wherein an electrode plate at an outermost layer of the electrode assembly is the first electrode plate.

9. A battery, comprising:
a housing; and
an electrode assembly according to claim 1, wherein the electrode assembly is arranged in the housing.

10. A battery module, comprising a plurality of batteries according to claim 9.

11. A battery pack, comprising a plurality of battery modules according to claim 10.

12. A device using the battery, comprising the battery according to claim 9, wherein the battery is configured to provide electric energy for the device.

13. A manufacturing method of an electrode assembly, comprising:
providing a plurality of first type of electrode plates, at least one second type of electrode plate and a diaphragm, wherein the polarity of the plurality of first type of electrode plates is opposite to the polarity of the at least one second type of electrode plate, the diaphragm is configured to separate adjacent first type of electrode plate from the second type of electrode plate, the plurality of first type of electrode plates comprises a first electrode plate and a second electrode plate, the first electrode plate comprises a first current collector, the second electrode plate comprises a second current collector, wherein the first current collector comprises a first conducting layer and a protective layer which are arranged in an overlapping manner along a direction vertical to a surface on which the first type of electrode plate and the second type of electrode plate are overlapped, and the resistivity of the protective layer is greater than the resistivity of the first conducting layer, the first current collector comprises two of the protective layers, respectively arranged at two sides of the first conducting layer; the second current collector is composed of a second conducting layer; and
arranging the plurality of first type of electrode plates, at least one second type of electrode plate and the diaphragm in an overlapping manner.

* * * * *